(12) United States Patent
Nordholt et al.

(10) Patent No.: US 10,291,399 B2
(45) Date of Patent: May 14, 2019

(54) QUANTUM-SECURED COMMUNICATIONS OVERLAY FOR OPTICAL FIBER COMMUNICATIONS NETWORKS

(71) Applicant: Los Alamos National Security, LLC, Los Alamos, NM (US)

(72) Inventors: Jane Elizabeth Nordholt, Los Alamos, NM (US); Richard John Hughes, Los Alamos, NM (US); Charles Glen Peterson, Los Alamos, NM (US); Raymond Thorson Newell, Santa Fe, NM (US)

(73) Assignee: Traid National Security, LLC, Los Alamos, NM (US)

( * ) Notice: Subject to any disclaimer, the term of this patent is extended or adjusted under 35 U.S.C. 154(b) by 235 days.

(21) Appl. No.: 15/026,001

(22) PCT Filed: Sep. 30, 2014

(86) PCT No.: PCT/US2014/058420
§ 371 (c)(1),
(2) Date: Mar. 30, 2016

(87) PCT Pub. No.: WO2015/048783
PCT Pub. Date: Apr. 2, 2015

(65) Prior Publication Data
US 2016/0218867 A1  Jul. 28, 2016

Related U.S. Application Data

(60) Provisional application No. 61/884,874, filed on Sep. 30, 2013.

(51) Int. Cl.
*H04L 9/08* (2006.01)
(52) U.S. Cl.
CPC ................... *H04L 9/0852* (2013.01)

(58) Field of Classification Search
None
See application file for complete search history.

(56) References Cited

U.S. PATENT DOCUMENTS 5,768,378 A * 6/1998 Townsend ........... G02F 1/13471
380/256
7,248,695 B1 * 7/2007 Beal ..................... H04L 9/0852
380/256
(Continued)

FOREIGN PATENT DOCUMENTS

WO   WO-2011139304   11/2011

OTHER PUBLICATIONS

Gordon, "Very Simple Method to Find the Minimum Polynomial of an Arbitrary Nonzero Element of a Finite Field," Electronics Letters 12, pp. 663-664 (1976).
(Continued)

*Primary Examiner* — William J. Goodchild
(74) *Attorney, Agent, or Firm* — Pierce Atwood LLP; Kevin M. Farrell

(57) ABSTRACT

Quantum secure communication systems communicate quantum signals for quantum key distribution and classical signals with encrypted data and commands via a single optical fiber. In some systems, the single fiber carries classical data in both directions along with quantum communications. For example, quantum keys can be used to encrypt packets for bidirectional communication between two parties. In other systems, a single fiber is used for one way classical communications and quantum communications. The communication systems are secured using a security parameter based on the quantum and classical communications across the optical fiber.

22 Claims, 13 Drawing Sheets

(56) References Cited

U.S. PATENT DOCUMENTS

| | | | |
|---|---|---|---|
| 7,460,670 B1 | 12/2008 | Elliott | |
| 7,809,268 B2* | 10/2010 | Meli | H04J 14/0227 |
| | | | 380/256 |
| 8,170,211 B2* | 5/2012 | Langer | H04L 9/0858 |
| | | | 380/256 |
| 2004/0005061 A1* | 1/2004 | Buer | G06F 21/602 |
| | | | 380/282 |
| 2006/0059343 A1* | 3/2006 | Berzanskis | H04L 7/0008 |
| | | | 713/171 |
| 2008/0137858 A1* | 6/2008 | Gelfond | H04B 10/70 |
| | | | 380/256 |
| 2009/0279698 A1* | 11/2009 | Langer | H04L 9/0858 |
| | | | 380/256 |
| 2012/0195430 A1 | 8/2012 | Niskanen et al. | |
| 2014/0028116 A1* | 1/2014 | O'Brien | H02H 3/02 |
| | | | 307/130 |

OTHER PUBLICATIONS

International Search Report and Written Opinion for International Patent Application No. PCT/US2014/058420 dated Dec. 29, 2014 (9 pages).

Krawczyk, "LFSR-based Hashing and Authentication," CRYPTO '94, LNCS 839, pp. 129-139 (1994).

Shoup, "Fast Construction of Irreducible Polynomials over Finite Fields," Journal of Symbolic Computation 17, pp. 371-391 (1994) extended abstract in Proc. 4th Annual Symposium on Discrete Algorithms (SODA) pp. 484-492 (1993).

Xu et al., "Fixed-point Analysis and Realization of a Blind Beamforming Algorithm," Proc. SPIE 3807, 188-199 (1999).

* cited by examiner

QUANTUM-SECURED COMMUNICATIONS OVERLAY FOR OPTICAL FIBER COMMUNICATIONS NETWORKS

CROSS REFERENCE TO RELATED APPLICATIONS

This application claims the benefit under 35 U.S.C. § 119(e) of the following application, the contents of which are incorporated by reference herein:

U.S. Provisional Application No. 61/884,874, entitled Quantum-Secured Communications Overlay For Optical Fiber Communications Networks, filed on Sep. 30, 2013.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure relates generally to encryption systems and methods, and, more specifically, to systems and methods that combine classical and quantum communications.

BACKGROUND

Cryptographic methods can provide data recipients with assurances on the authenticity of the origins of multicast data to protect against impersonation, substitution or replay attacks. However, in the context of many applications, such as electric grid control, it is difficult to simultaneously meet a desired security and quality-of-service (QoS). For example, although appending a message authentication code (MAC) tag to data using a pre-shared group key would be sufficiently fast, this would be vulnerable to compromise of a single node.

Latency requirements are major obstacles to achieving security objectives for critical infrastructure with conventional approaches based on public key cryptography: the necessary number-theoretic computations are too time-consuming when implemented on the commodity processors that are typically used. Symmetric key cryptographic methods of authentication using keyed message authentication codes, using the keyed-Hash Message Authentication Code (HMAC) algorithm for example, also have latency problems associated with the buffering of data required to evaluate the HMAC tag at the transmitter, and the hold-back of data at the receiver required to confirm the tag. This approach also introduces an undesirable amount of bandwidth expansion. One-time signature (OTS) schemes would be capable of meeting both the authenticity and latency requirements, but the key management for these schemes has been identified as a major unsolved challenge. Key management more generally, and the production, capture and secure distribution of entropy as cryptographic keys in particular, is a specific cyber security challenge for applications such as the Smart Grid, high speed trading, and applications using multiplexed data streams over a single optical fiber. From a system management cost perspective, it is highly desirable that a solution implemented today have reliable security assurances, obviating the need for future security upgrades.

In contrast public key methods require active management (of key sizes) to stay ahead of advances in computational number theory.

Quantum key exchange and other quantum protocols can provide enhanced security. These quantum protocols are based on the transmission and detection of properties of one or a few photons. Quantum protocols generally require the associated optical signals to be isolated from conventional optical signals which are at optical powers that are many orders of magnitude greater than the very small powers of the quantum signals. Unfortunately, many communication standards are based on one or two optical fibers so that quantum signals and classical communications signals must necessarily share an optical fiber. Thus, conventional quantum security approaches cannot co-exist with conventional optical communications, and cannot be used in many applications in which both quantum and classical communication are required on a single fiber.

SUMMARY

Quantum Secure Communication (QSC) systems use quantum communication and classical communications over a single optical fiber to establish shared keys for data security. In some examples, apparatus comprise a quantum communicator coupled to a communication optical fiber and configured for quantum communication via the communication optical fiber. A classical transceiver is coupled to the communication optical fiber, and configured for classical communication via the communication optical fiber. A processor is configured to establish a security parameter based on quantum communications associated with the quantum communicator and classical communications associated with the classical communicator via the communication optical fiber. In some examples, the security parameter is at least one shared key. In further examples, the quantum communicator is a quantum receiver configured to produce at least a portion of a raw key based on a quantum communication received via the communication optical fiber, and the classical transceiver is configured to transmit via the communication optical fiber an identification at least one quantum basis associated with a detected portion of the raw key. In other examples, the quantum communicator is a quantum transmitter configured to transmit quantum values associated with at least a portion of a raw key, and the classical transceiver is coupled to transmit via the communication optical fiber an identification of at least one basis associated with a transmitted portion of the raw key. In some embodiments, the processor is configured to produce packetized data for transmission, wherein the packetized data includes a data flag identifying a packet as containing a parameter associated with quantum key exchange. In other examples, the processor is configured to insert a parameter associated with quantum key exchange in the packetized data without encryption. In other examples, the processor is configured to direct data or commands associated with a phasor measurement unit (PMU) or a phasor data concentrator (PDC) for transmission by the classical transceiver, wherein the transmitted data or commands are encrypted based on a shared key obtained in part by quantum communication. According to other examples, the classical transceiver is configured to communicate via the communication optical fiber in a first wavelength range and the quantum communicator is configured to communicate via the communication optical fiber in a second wavelength range. In a particular example, the first wavelength range is a 1310 nm range and the second wavelength range is a 1550 nm range. In some cases, both quantum and classical communications are in the same wavelength band such as in 1310 nm band or a 1550 nm band. In other examples, the quantum communicator is a quantum receiver, and a spectral filter is situated to attenuate optical signals directed towards the quantum in the first wavelength range by at least 80 dB. In one embodiment, the spectral filter comprises a fiber Bragg grating coupled to an optical circulator.

Methods comprise communicating quantum and classical optical signals over a single optical fiber, and based on received quantum and classical optical signals, producing at least one shared key. According to some examples, user data or commands are communicated over the single optical fiber, wherein the user data or commands are encrypted based on the at least one shared key. In other examples, generating shared keys and communicating user data and commands occur concurrently. In still other examples, classical optical signals associated with quantum key generation are communicated over the single optical fiber without encryption. In further embodiment, user data or commands that are encrypted based on the at least one shared key are communicated in a data packet that includes a data flag indicating the presence of encrypted user data or commands in the data packet. In a particular example, the data packet is a TCP packet and a source or destination point identifier is associated with the data flag indicating the presence of are encrypted user data or commands in the data packet, wherein the data flag further indicates the presence of data associated with quantum key generation in the data packet.

Network nodes comprise a communication port configured for coupling to a single optical fiber, and a processor configured to packetize user data as encrypted data or quantum key exchange data as plaintext and designate that the associated data packet includes encrypted data or quantum key exchange data with a data flag. An optical transceiver configured to deliver the data packet to the communication port.

The foregoing and other objects, features, and advantages of the disclosed technology will become more apparent from the following detailed description, which proceeds with reference to the accompanying figures.

DETAILED DESCRIPTION

Figure 1:
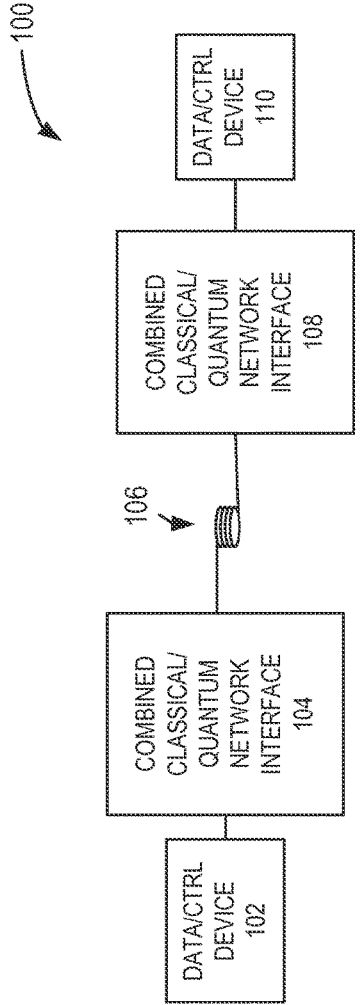
FIG. 1 is a block diagram of a representative communication system that includes quantum security.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

The disclosed methods can be implemented using computer-readable media. Computer-readable media are any available tangible media that can be accessed within a computing environment. By way of example, and not limitation, with a computing system, computer-readable media include memory, storage, and combinations of any of the above. Such media can store computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Representative Quantum Secure Communication (QSC) Systems

Quantum secure communication (QSC) systems can be deployed as a bump-in-the-wire security retrofit to an existing optical fiber communications link, or as a single-fiber secure communications link. Such systems are compatible with a variety of established optical fiber communications standards, including in particular, the widely deployed 1,310-nm 1000Base-LX protocol. In some examples, QSC systems can include plug-and-play interfaces for end device communications using TCP/IP or serial standards such as the Supervisory Control and Data Acquisition (SCADA), and provide low-latency streaming encryption, authentication, and digital signatures for packet/frame payloads. In the disclosed examples, keys obtained by quantum key exchange are generally shown as used for encryption and decryption, but such keys can be used for authentication and digital signatures, and some or all of these functions can be provided, as needed. In one example system, total time between encryption and decryption was typically 250 µs, which included ~120 µs of transmission time over a 25 km optical fiber. Key management functions can be entirely self-contained to QSC systems and require no user involvement. Low-latency cryptography is especially valuable for the critical infrastructure sector, where combined security and latency requirements are challenging to meet with conventional approaches. Other application such as high speed trading systems have similarly challenging requirements. QSC systems have future proof security (an adversary would have to break incontrovertible laws of physics) and QSC systems can continue to operate without downtime associated with security updates as required in conventional approaches. In addition, QSC has forward security—even if a design weakness is discovered in the future, no QSC-secured data up to that time would be compromised. QSC systems can secure a data bandwidth of at least 100 Mbps over fiber lengths of up to 80 km. A secured bandwidth can be multiplexed between several data streams, so that QSC systems can support multi-level security.

In one application, QSC systems are configured for electrical power grid monitoring and control, and are configured for use with SCADA and a phasor Measurement Unit (PMU). A PMU can communicate via a standard C37.118 protocol to a QSC system, which then handles key generation, communication and encryption/decryption of the connection over an optical fiber. Phasor data concentrators (PDCs) can receive and process data from PMUs. Both PMU-to-PDC data and PDC-to-PMU commands were secured across the 25-km optical fiber link using QC.

In some disclosed examples, a quantum communication (QC) transmitter ("Alice") and a QC receiver ("Bob"), are associated with respective classical optical transceivers. A single optical fiber is coupled so as to carry both quantum and bi-directional classical communications between them. In a particular application, Alice and Bob receive TCP/IP packets as input, encrypt the payload of each packet using quantum keys expanded by the ANSI X9.31 protocol, and transmit encrypted TCP/IP packets to their counterpart, where it is decrypted and employed directly. For many applications, user equipment is connected and controlled via a single optical fiber using such packetized data and commands.

With reference to FIG. 1, a communication system 100 includes a data/control device 102 such as any of various user data gathering and/or control devices (e.g., PDCs, PMUs). A combined classical/QC network interface 104 is coupled to communicate via an optical fiber 106. For long distances, single mode fiber is typically selected to reduce fiber loss, but multimode fiber can be used. The network interface 104 typically includes a classical transceiver for conventional communications based on amplitude, phase, or frequency modulation of an optical signal. The interface 104 also includes a QC transmitter (or QC receiver, or both, if desired) configured to communicate QC signals via the fiber 106. Typically, the QC transmitter encodes based on quantum states that are specially defined properties of photons such as pairs of polarization states (e.g., 0° and 90°, or 45° and 135°) or circular basis states (e.g., left-handedness and right-handedness). The pairs of states form conjugate bases, and states within each pair (i.e., within a particular basis) are orthogonal to the other state from the same basis. Using such states, a transmitter and receiver can produce a shared random series of bits known only to the transmitter and receiver, which can then be processed for use as secret keys in subsequent encryption and decryption of messages. The process of producing such keys through QC is also called quantum key distribution ("QKD"). Generally, the transmitter selects a random bit and encodes the random bit based on a selected state of two pairs of quantum states.

The network interface 108 includes a classical transceiver and a QC receiver that are coupled to the fiber 106. The QC receiver is configured to detect quantum signals from the QC transmitter and assign suitable values. The QC receiver generally selects states from among pairs of states used by the QC transmitter. While the QC transmitter does not always select states corresponding the state used by the QC transmitter, additional classical communications permit establishment of keys. For example, the classical transceiver at the QC transmitter sends the basis used for sending each bit to the receiver, and the classical transceiver at the QC receiver sends the basis used for measuring each bit to the transmitter. Based on these communications, the transmitter and receiver can discard bits for which the receiver used a different basis. This basis information can be transmitted without encryption in a classical communication. In addition, the transmitter and receiver can be configured to compare some bits of the QC. In the presence of eavesdroppers, the receiver measurements typically have increased errors. If the receiver errors are too large, the transmitter can send new or additional QC signals to re-attempt key generation. If the number of receiver errors is acceptable, additional classical communications can be used for information reconciliation, privacy amplification, or other procedures associated with establishment of shared keys. This protocol is referred to as the BB84 protocol, but other protocols and conjugate bases can be used.

The network interface 108 is configured so that the classical transceiver can send and receive data from user data gathering and/or control devices 110 such as such as a PDC or PMU. As noted above, the classical transceiver is also configured for communication of parameters related to basis state comparisons, information reconciliation, privacy amplification, or other procedures associated with establishment of shared keys, but not requiring QC signals. Such parameters are referred to as QKD parameters herein.

Figure 2:
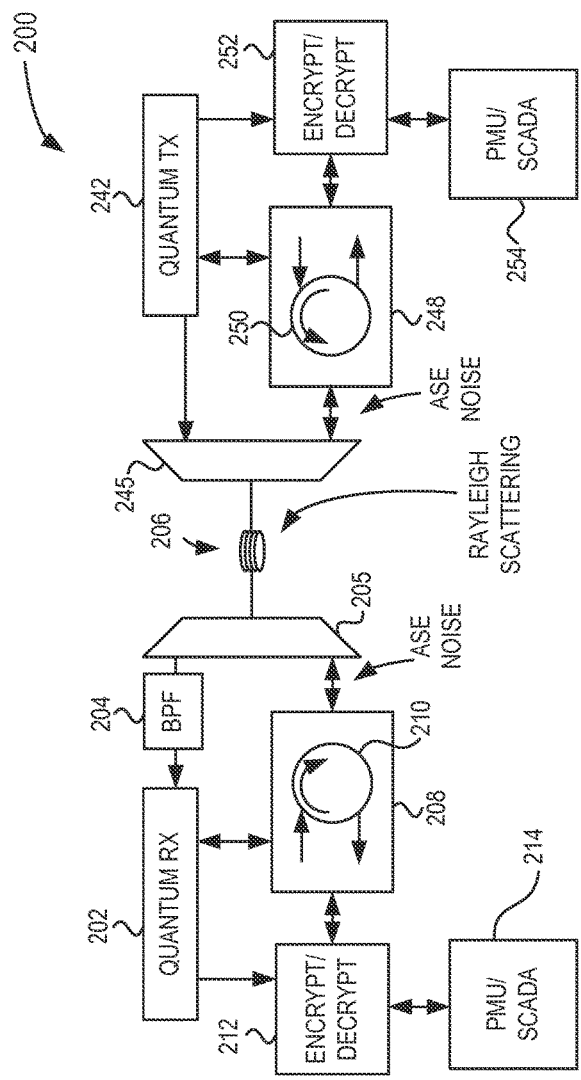
FIG. 2 is a block diagram of a representative quantum secured communication system (QSC) that includes classical and quantum communications at respective wavelengths.

FIG. 2 illustrates a QSC system 200 that is based on wavelength division multiplexing. A quantum transmitter 242 that produces quantum signals at a first wavelength is coupled to a wavelength division multiplexer (WDM) 245 that couples the quantum signals to a fiber 206. The quantum transmitter 242 is also coupled to a classical transceiver 248 that includes an optical circulator 250. Classical data and/or commands from a data/control device 254 are coupled via an encryption/decryption processor 252 to the classical transceiver 248. The classical transmitter 248 produces a classical signal at a second wavelength that is combined with the QC signal by the WDM 245 for communication to a WDM 205.

A combined QC/classical communication received by the WDM 205 is separated so that QC signals (at the first wavelength) are directed to a quantum receiver 202 via a bandpass filter (BPF) 204. Classical signals (at the second wavelength) are directed to a classical transceiver 208 that includes an optical circulator 210. An encryption/decryption processor 212 is coupled to the quantum receiver 202 and the classical transmitter 208. A data and/or command source 214 is coupled to the processor 212 so that data for communication with the classical transceiver 208 can be encrypted or decrypted. The encryption/decryption processors 212, 252 are configured to extract and store keys based on QC signal communication, after information reconciliation and privacy amplification or other processes if such processes are desired. In addition, QKD parameters can be coupled from the quantum receiver 202 and the quantum transmitter 252 directly to the classical transceivers 208, 248, respectively, as these parameters generally do not require encryption.

As shown in FIG. 2, QC signals are at a first wavelength and classical signals are at a second wavelength. Convenient wavelengths are about 1550 nm and 1300 nm due to the relatively high transmittance of readily available communications optical fibers at these wavelengths. The WDMs 205, 245 add signals at both wavelengths so as to propagate in the single mode fiber 206. The optical circulators 210, 250 couple ingoing and outgoing optical signals from a single fiber onto separate fibers inside the transceivers 208, 248, respectively. With ingoing and outgoing optical signals on separate fibers, outgoing optical signals can be filtered to reduce interference with QC signal photons. For classical transceivers operating at about 1310 nm, the associated transmission lasers typically emit in a broad spectrum that extends into the optical band at 1550 nm, so that a QC receiver/transmitter may receive unwanted classical transmitter optical powers. The circulators 210, 250 permit incoming signals to be transmitted without attenuation by filters selected to reduce this broad spectral background, requiring higher power in the classical (1310 nm) transmitters. FIG. 2 illustrates such background as amplified spontaneous emission (ASE) which can be produced by classical transmitters.

Interaction of the relatively high power 1310 nm optical signals with an optical fiber can also result in Raman scattering of photons into a QC band, so that 1310 nm optical power in excess of that needed for classical communication is undesirable. In typical (classical) optical communication, the broad spectrum optical power from 1310 nm lasers is several orders of magnitude (10 s of dB) below the power level in the operating band depending on the wavelength where it is measured, and well below what a typical photodiode can detect. However the single photon detectors used for QC signal detection can detect light at −110 dBm; by contrast, classical communication systems typically operate at ~0 dBm. The coexistence of classical and QC signals in the disclosed examples generally is based on reducing interfering optical signals in the QC band. In typical examples, classical signals are attenuated by at least 60, 70, 80, 90, 100, 110 dB using one or more spectral filters.

Figure 3:
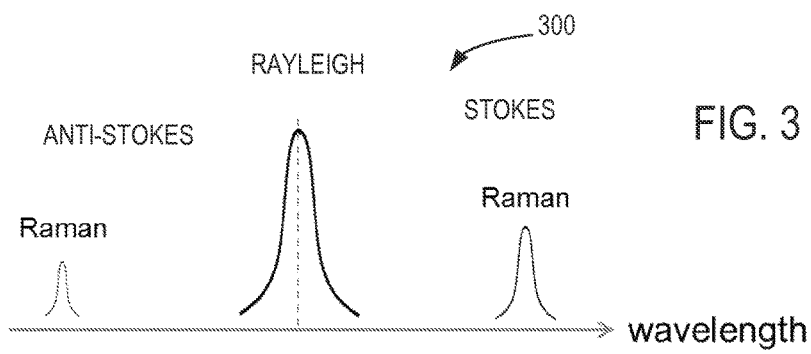
FIG. 3 illustrates some sources of background radiation that can disturb quantum communications.

Broadband background optical emission from classical transmitter sources such as laser diodes is not the only source of undesirable optical radiation. As shown in FIG. 3, a classical laser signal at an emission wavelength produces corresponding broadened Rayleigh backscattered radiation, as well as Raman scattered Stokes and anti-Stokes radiation. This effect is visible in graph 300. If classical transceivers with a wavelength shorter than a QC wavelength are used, anti-Stokes radiation can appear in the QC wavelength band; for classical transceivers at a wavelength longer than the QC wavelength, Stokes radiation can appear in the QC band. Because anti-Stokes scattering is generally less efficient than Stokes scattering, selecting a QC wavelength shorter than a classical wavelength can be preferred. However, for some applications, a classical transceiver wavelength is determined by installed hardware, and wavelengths associated with QC and classical communications cannot be freely selected.

Figure 4:
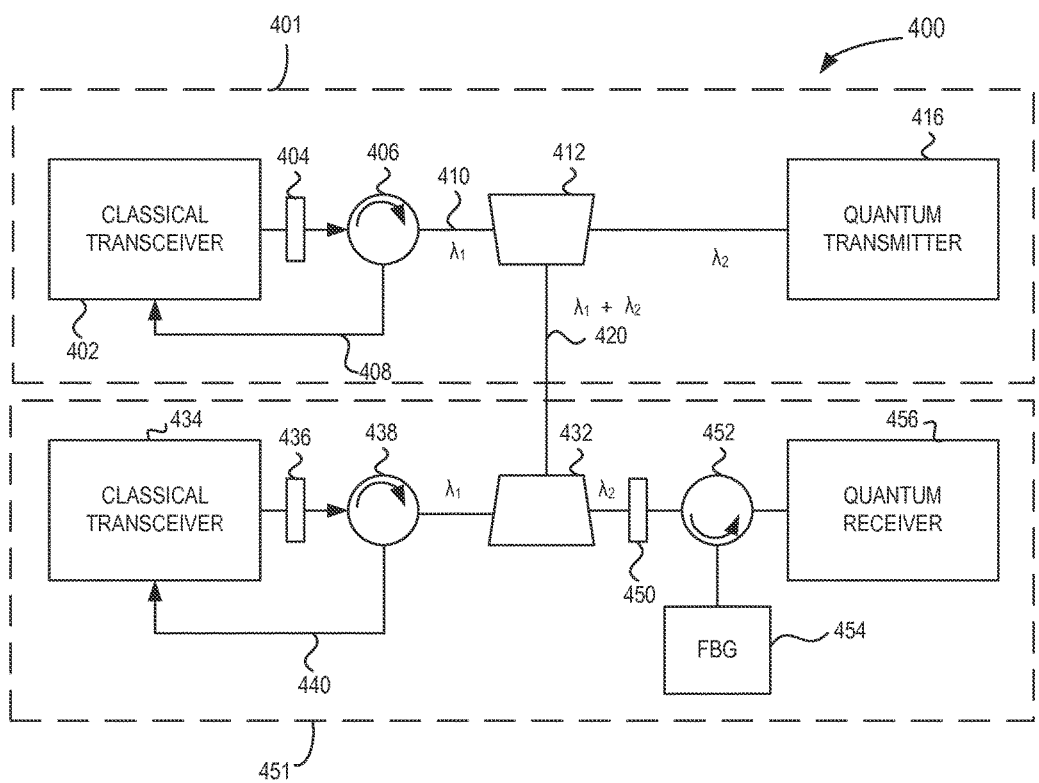
FIG. 4 is a block diagram of a representative quantum secured communication system that includes a Bragg filter associated with a quantum receiver. In the example of FIG. 4, duplex conventional communications use a first wavelength (for example, 1310 nm), while quantum communications operate on the same optical fiber at a second wavelength (for example, 1550 nm), and classical and quantum communications can co-exist.

Referring to FIG. 4, a QSC communication system 400 includes a first QSC transceiver system 401 and a second QSC transceiver system 451 coupled to communicate over a fiber 420. The first QSC transceiver system 401 includes a classical transceiver 402 that produces optical signals that are coupled to an optical circulator 406 through a bandpass filter 404. The classical transceiver 402 is also configured to receive incoming optical signals from the circulator 406 in the first wavelength band. With the arrangement of FIG. 4, incoming signals in a first wavelength band from a WDM 412 can be routed to a fiber 408 for detection while outgoing optical signals in the first wavelength band are coupled by the WDM 412 to a fiber 420. A common optical fiber 410 couples incoming and outgoing optical signals to the WDM 412. A quantum transmitter 416 is configured to produce QC signals for QKD in a second wavelength band and these signals are coupled to the fiber 420 as well by the WDM 412. In some examples, the common optical fiber 410 is used for QC signals, and one-way classical communication instead of bidirectional communication, and an additional fiber (or other communication link) if provided for a second communication direction.

The second QSC transceiver system 451 includes a classical transceiver 434 that produces optical signals that are coupled to an optical circulator 438 through a bandpass filter 436. The classical transceiver 434 is also configured to receive incoming optical signals from the circulator 438. With the arrangement of FIG. 4, incoming signals in the first wavelength band from a WDM 432 can be routed to a fiber 440 while outgoing optical signals in the first wavelength band are coupled by the WDM 432 to the fiber 420. The use of a circulator is more efficient than a conventional fiber coupler which introduces loss in separating incoming and outgoing optical signals. Using couplers could require higher classical optical powers, which are generally undesirable.

A quantum receiver 456 is configured to receive QC signals for QKD in the second wavelength band from the fiber 420. The WDM 432 couples incoming QC signals to the quantum receiver 456 via a bandpass filter 450 (for example, a multilayer dielectric filter) and an optical circulator 452 that is coupled to a fiber Bragg grating (FBG) 454. The QC signals are first filtered by the bandpass filter 450. At the circulator 452, the filtered QC signals are directed to the FBG 454 and Bragg reflected, filtered QC signals are returned to the circulator 452 and coupled to the quantum receiver 456.

The circulator 452 and the FBG 454 provide additional filtering so that any non-QC signal radiation is attenuated so that analysis by the quantum receiver 456 is satisfactory. The QC signals are typically produced by an attenuated laser and are narrow-band so that spectral filtering at the output is unnecessary. In addition the narrow bandwidth of the QC signals permits use of a narrow bandwidth filter on signals to the quantum receiver 456. The circulator/FBG combination shown in FIG. 4 serves as a narrow bandwidth filter that reduces the number of unwanted photons reaching detectors of the QC receiver 456. For example, unwanted photons produced by Raman scattering of 1310 nm signals or residual broadband radiation that is not rejected by the filters 404, 436 can be further attenuated. In a representative example, a 1550-nm quantum channel can be configured to have >110 dB of isolation from a 1310-nm classical channel.

In some implementations, QC signal arrival times are used to identify QC signals to separate such signals from background radiation and detector noise. Time-filtering can be used to identify QC signals, and can be based on variable timings to accommodate different fiber lengths.

Representative QC System Components

Figure 5:
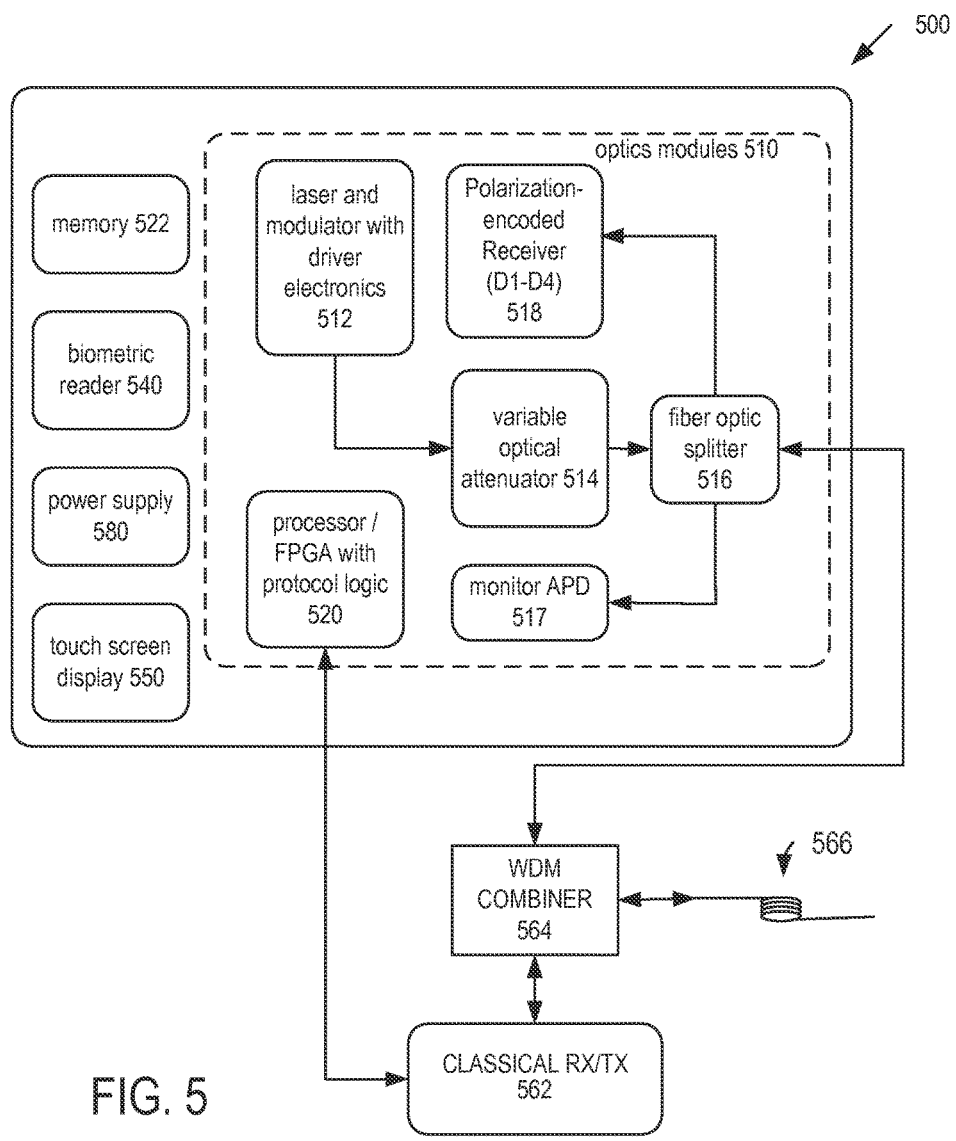
FIG. 5 is a block diagram of a portion of a representative quantum secured communication system that includes a quantum communication transceiver.

As shown in FIG. 5, a representative QC transmitter/receiver 500 includes a plurality of optics modules or optical elements 510 adapted for fiber communication. The optics modules 510 transmit binary information for which modulation of quantum state is measured (by a QC receiver). The optics modules 510 can also provide a network transceiver adapted to transmit and receive information in a public channel over the optical fiber, transmitting and receiving binary information for which modulation of quantum state is not measured by a QC receiver. In many applications, a QC transceiver is not needed, and a QC transmitter is needed at one node and a QC receiver at another.

Among the optics modules 510, the laser and modulator with driver electronics 512 include a laser adapted to generate photons for QC transmission and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°, typically corresponding to one or more conjugate polarization bases. Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced. In some implementations, lasers are provided for each polarization state.

The variable optical attenuator 514 is optically coupled to the laser. The attenuator is adapted to reduce photons per pulse of the laser, which improves security of the QC by foiling eavesdropping attempts that intercept extra photons. The monitor avalanche photodiode ("APD") 517 is split from other modules by the fiber optic splitter 516 and adapted to measure number of photons per pulse from the laser used for QC. For example, the APD 517 is implemented with one or more InGaAs photon detectors. The APD 517 provides feedback used to control the laser and attenuator 514 for QC.

The processor/field-programmable gate array ("FPGA") with protocol logic 520 controls different operations as part of QC. In particular, the processor/FPGA 520, which is electrically coupled to the module 512, is configured to coordinate operations of the laser and the modulator through driver electronics included with the laser and modulator 512. A random number generator generates a series of random bits for high-quality random numbers. With high-fidelity polarization control, the processor/FPGA 520 controls the polarization of photons with the modulator to encode random bits as different polarization states according to a QC protocol. The processor/FPGA 520 monitors the number of photons per pulse (measured with the APD 517) for the QC. Through control of the laser and variable optical attenuator 514, the processor/FPGA 520 can selectively reduce photons per pulse of the laser to an average level of a single photon per pulse.

The processor/FPGA 520 thus controls the timing and pattern of the single-photon pulses produced by the laser for QC. The processor/FPGA 520 also controls the timing and pulses of higher power pulses (so-called "bright" pulses) produced for synchronization, non-quantum communication and/or other purposes.

For other aspects of the QC protocol, the processor/FPGA 520 controls operations associated with recording the quantum state and sending basis per pulse for the QC, transmitting the recorded sending bases, to, and otherwise processing conventional QC protocol elements. The processor/FPGA 520 can coordinate operations for privacy amplification and decoy states to further improve security. Privacy amplification reduces the length of a shared bit string (e.g., by hashing with a hash function) to reduce partial information that an eavesdropper might have gained. The final length of the string can be set depending on the number of errors detected. For imperfect single-photon sources such as weak laser pulses, decoy states of different average photon numbers (brightness) can be transmitted so that the error rate and number of single photons in a bit string can be determined and used to regulate the degree of privacy amplification.

The memory 522 stores one or more keys. For example, the memory 522 stores quantum keys. In some implementations, the memory 522 is secure memory and keys are stored in encrypted form. The memory 522 can be fabricated along with the integrated optics modules 510 or separately placed.

The biometric reader 540 is a scanner or other module adapted to accept biometric indicia of a user. For example, the biometric reader 540 is a fingerprint scanner. The processor/FPGA 520 can include logic for encrypting the biometric indicia with a key stored in the secure memory 522.

Or, one or more other encryption modules (not shown) can provide such encryption functionality.

The touch screen display 550 accepts user input (e.g., to a numeric keypad) that can be encrypted along with the biometric indicia as part of user authentication. The touch screen display 550 also displays information to the user (e.g., a count of quantum keys in memory 522, a prompt to contact a trusted authority to make quantum keys, a prompt to initiate secure communication with another, or a prompt for another function) and accepts user input.

The power supply 580 is a source of electrical energy adapted to supply power to the QC transmitter/receiver 500. For example, the power supply 580 can be a voltage source.

Outside of the integrated optics modules 510, most of the functional modules can be implemented with standard components for portable or non-portable devices. Among the integrated optics modules 510, many of the modules (e.g., attenuator 514), monitor APD 517, splitter 516 and polarization encoded receiver 518 can be implemented with standard components for fiber optic or other optical components. Other functional modules (e.g., FPGA) can be implemented with control components that have been used with conventional QC transmitters to: (1) produce specific polarization states with a fiber-optic modulator; (2) regulate production of precisely timed QC and bright pulses in a known pattern to track timing and time variations when performing QC; (3) monitor average photon number per pulse using the timing system and APD 517; (4) control APD bias, gating, and discriminator electronics; (5) process conventional QC protocol control elements, e.g., to track, correct and exchange polarization state information. The receiver 518 is configured to deliver bits encoded as a particular state of polarization to a corresponding detector. For QC using two conjugate bases, four detectors D1-D4 are usually provided. If a modulator is used to switch actively between bases, two detectors could be used.

As shown in FIG. 5, a classical receiver, transmitter, or transceiver 562 and the fiber optic splitter 516 are coupled to a WDM beam combiner 564 so that combined QC and conventional optical signals are coupled to a fiber 566.

Representative Data Processing Systems and Methods

Figure 6:
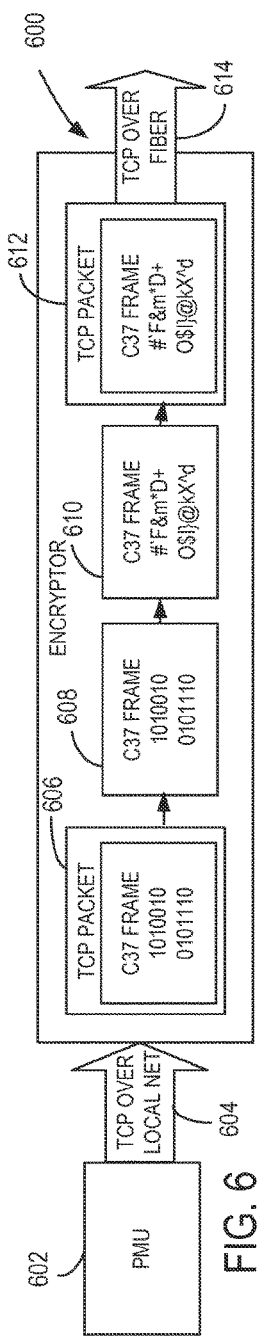
FIG. 6 illustrates data packet encryption based on a shared key obtained via quantum key exchange.
Figure 7:
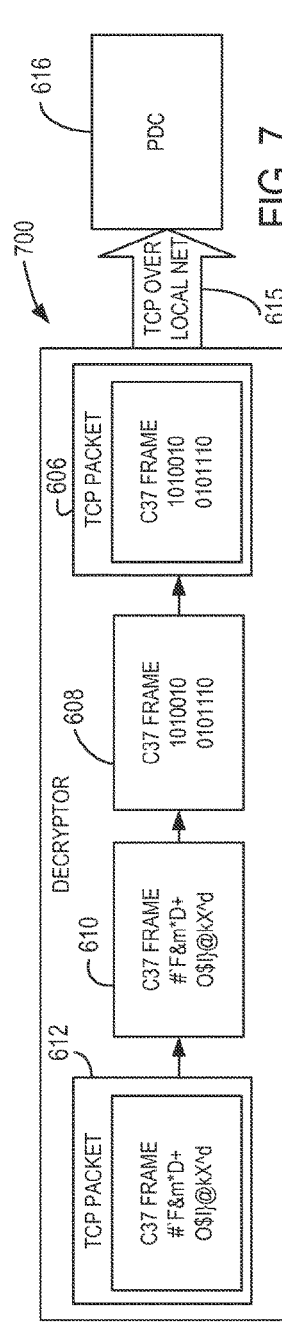
FIG. 7 illustrates data packet decryption based on a shared key obtained via quantum key exchange.

Data encryption 600 is illustrated in FIG. 6. A TCP packet 606 is extracted from a data stream from a PMU 602 that is received via a local network 604. A data frame 608 is identified in the TCP packet, and encrypted data 610 is produced, based on a key obtained via QKD. A TCP packet 612 is then produced that includes the encrypted data 610, and the TCP packet 612 transmitted on an optical fiber 614. Decryption 700 is illustrated in FIG. 7. The TCP packet 612 is received, the encrypted data 610 identified to produce the original data frame 608 for delivery to a PDC 616 or other data destination device via a local network connection 615.

Figure 8:
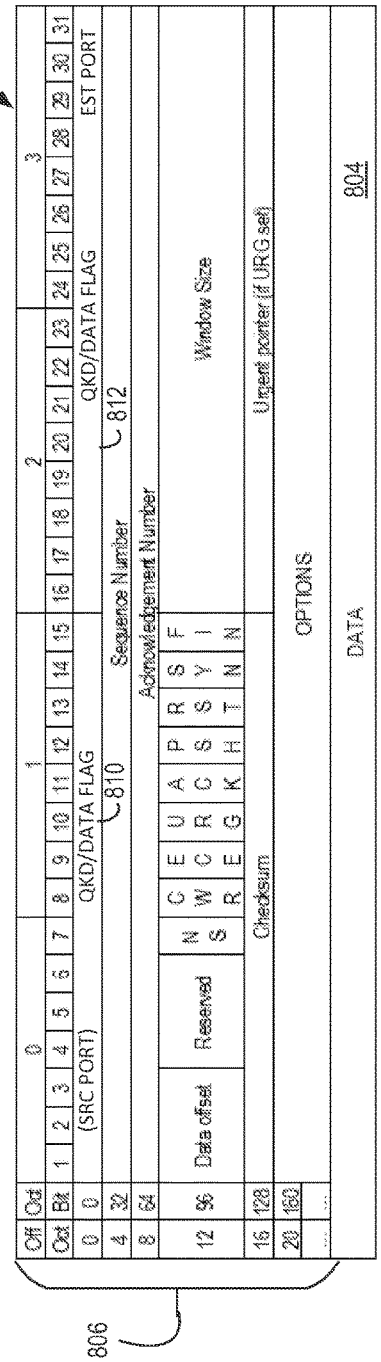
FIG. 8 illustrates a Transmission Control Protocol TCP data packet or data segment that is configured for transmission of data associated with classical and quantum communications.

FIG. 8 illustrates a TCP frame 800 (also referred to as a segment) that includes a data segment 804 that can include encrypted or unencrypted data. A header 806 includes various control values as well as designation of source port 810 and a destination port 812. QKD parameters can generally be communicated as plain text, and TCP frames with such data are designated by assigning one or more bits in the TCP frame 800 as an identifier. In one example, the source port 810 and/or the destination port 812 are assigned a value that designates a QKD parameter frame or a data frame (typically encrypted data).

As shown in FIG. 8, packet headers generally remain intact so that packets can be rerouted if necessary, without examination (i.e., decryption) of packet data. This is referred to as encryption at Layer 3 of the Internet protocol stack. Such encryption makes the network transparent to the encryption/decryption as normal packet routing flexibility is not disrupted. In other approaches (such as Layer 2 encryption), all bits including packet headers are encrypted. In such systems, data generally flows directly between users.

Information in data frames can be specified in various ways, such as, for example, a synchrophasor protocol (C37.118-2005) that specifies content and format of several types of information frames which carry data and commands between PMUs and PDCs. The transmission of these frames is in turn carried out by a network transport protocol such as TCP or UDP.

In representative QSC systems, both transmitters (Alice) and receivers (Bob) receive unencrypted TCP packets from co-located utility hardware. For example, Alice from a PMU, and Bob from a PDC. These TCP packets are parsed to extract C37.118 synchrophasor frames and each of the C37.118 frames is independently encrypted using quantum keys, and then repackaged into a new TCP packet with an unencrypted header for transmission through the fiber to the other terminal. The receiving terminal parses the incoming TCP packets, extracts encrypted C37.118 frames, decrypts the frames, and then repackages the frames into one or more new TCP packets which are acceptable to industry-standard synchrophasor devices. Because of the extra processing overhead in Layer 3 encryption, Layer 2 encryption is often used when low-latency is required. However, estimations of processing latency for encryption and decryption as a function of data packet size demonstrate that QC can perform with extremely low latency, ~30 ns/byte for packets larger than ~1000 bytes, even with the more difficult requirements of Layer 3 encryption.

Figure 9:
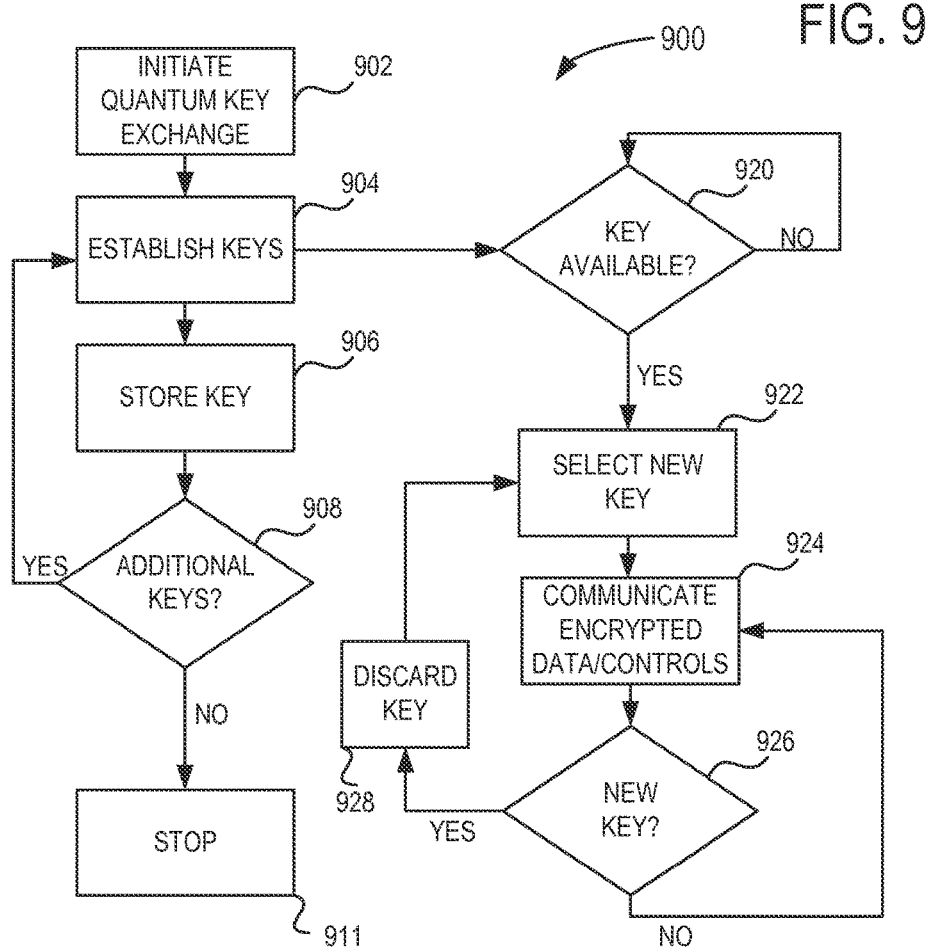
FIG. 9 illustrates a method of quantum key exchange in combination with ongoing classical data transmissions over a single optical fiber.

FIG. 9 illustrates a representative QSC method 900. At 902, quantum key generation is initiated, and at 904, keys are established and stored in a memory or memory device at 906. At 908, inquiry is made if additional keys are desired. If so, the method returns to 904 and additional keys are established until no more are desired and key generation is halted at 911. For communication of data and commands, at 920, key availability is tested. If a key is available from the QC procedure, a key is selected at 922 and data/commands are encrypted and communicated at 924. At 926, a new key can be indicated as appropriate, and the prior key discarded at 928. With either a new key or the prior key, data encryption and communication then continues at 924. Once QSC systems are initiated, key generation begins, and secure communication can be delayed until a key becomes available. In one implementation, 128-bit quantum keys were produced at a rate of a few per minute. Thus, keys can be changed several times per minute making it necessary for an adversary to break multiple quantum keys to read a minute's data—breaking a single key would be extremely difficult as an adversary can generally intercept fewer than $10^{-6}$ bits per key. Typically, key generation continues during periods of data generation and command and data communication.

The disclosed QSC systems can be deployed with only a single optical fiber to carry quantum, single-photon QC signals, PMU to PDC data packets, and PDC to PMU commands as required in an electric grid application. Such systems are scalable so as to include multiple PMUs and multiple PDCs. Keys produced by QC can be used to encrypt PMU to PDC data packets, and to encrypt PDC to PMU commands. This protects PMU data that an adversary might try to use to gain pricing advantages, or monitor as part of a GPS-spoofing attack. Other services such as authentication and non-repudiation can be provided with QC-generated keys.

Figure 10:
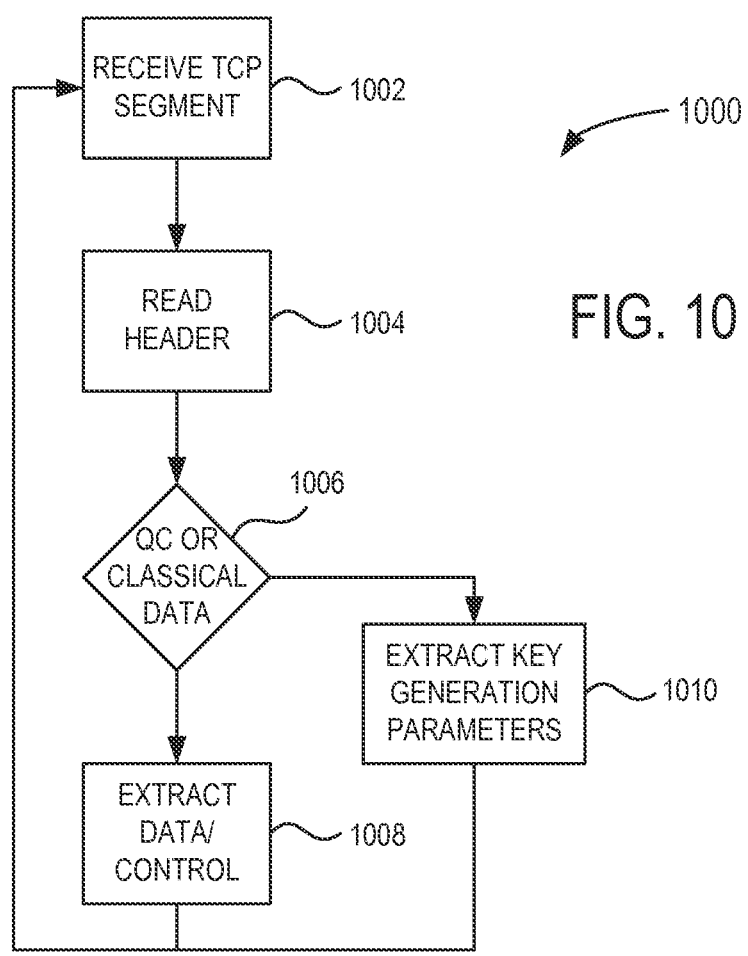
FIG. 10 illustrates a method of routing incoming data based on whether the incoming data is associated with classical data or commands or with parameters used in quantum key exchange.

Referring to FIG. 10, a method of processing data packets 1000 includes receiving a TCP segment at 1002. At 1004, a TCP header is at least partially read to extract a segment type flag. At 1006, the extracted segment type value is checked to determine if the TCP segment is a data/command segment for secure classical communication, or if the TCP segment includes QKD parameters. If a secure data/command segment, data values or commands are extracted based on decryption with a current key at 1008. If a QKD segment, key generation parameters are extracted at 1010, typically without need for decryption. In typical implementations, data/command segments and QKD parameter segments are continually received, and a mixed TCP segment stream is processed.

Figure 11:
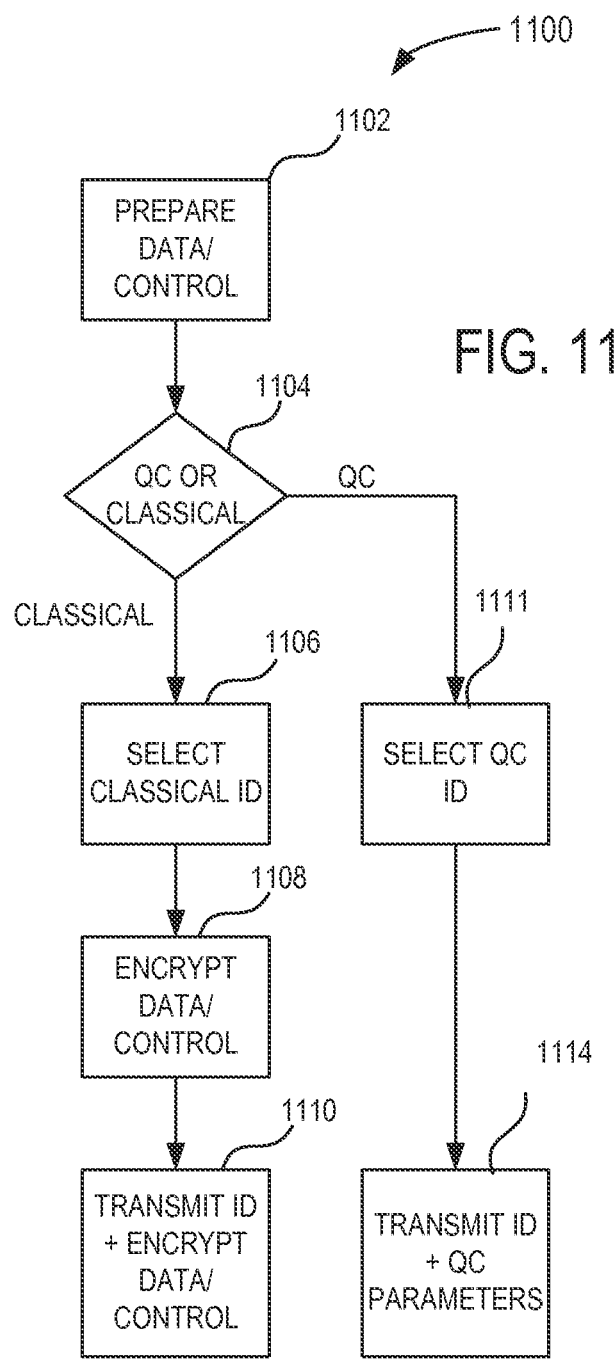
FIG. 11 illustrates a method of preparing classical commands or data and QC parameters for transmission.

FIG. 11 illustrates a method 1100 of preparing data packets for transmission. At 1102, data and/or commands for classical communication is received, or QC parameters for use in quantum key generation. At 1104, the received data is identified as either classical or QC information. If the received data is identified as classical information, a classical identification flag is selected at 1106, such as a designation port value to be inserted into a TCP packet. At 1108, the classical data (which may include reported data or commands) is encrypted using a QC generated key, and at 1110, the identification flag and the encrypted data are combined and transmitted. If QC data is identified at 1104, a QC identification flag is selected at 1111, such as a designation port value to be inserted into a TCP packet. At 1114, the identification flag and the QC data (generally without encryption) are combined and transmitted.

The examples above are described with reference to phasor measurement units (PMUs) or phasor data concentrators (PDCs) for use in electric grid monitoring and control. In other examples, such QSC communication systems can be used to exchange data and commands in a high-speed trading system, water management systems, or oil, gas, or other distribution systems.

Figure 12:
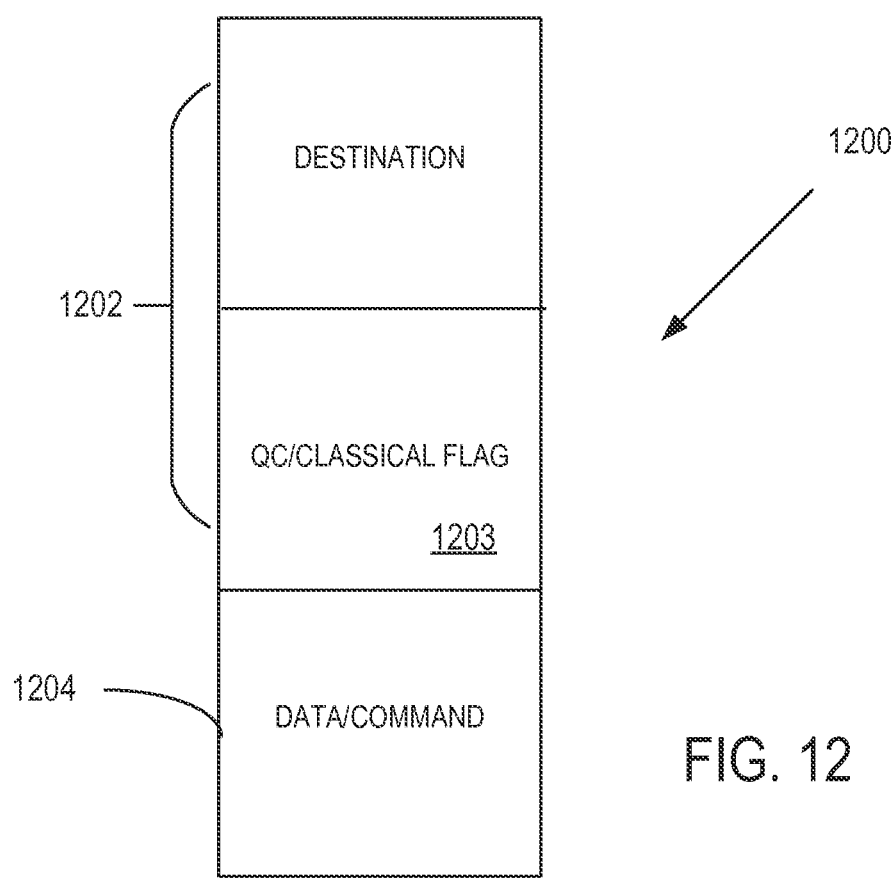
FIG. 12 illustrates a representative data packet configured for communication of QC and conventional data/commands.

FIG. 12 illustrates a representative data packet 1200 that includes a header 1202 containing routing information and a flag field 1203 identifying contents of a data segment 1204 as being associated with conventional data and commands (typically encrypted in a QSC system) or QC parameters (for which encryption is generally not used). The flag field 1202 can also be used to indicate that the data or commands have been processed so as to provide authentication, digital signatures, or other security process.

Figure 13:
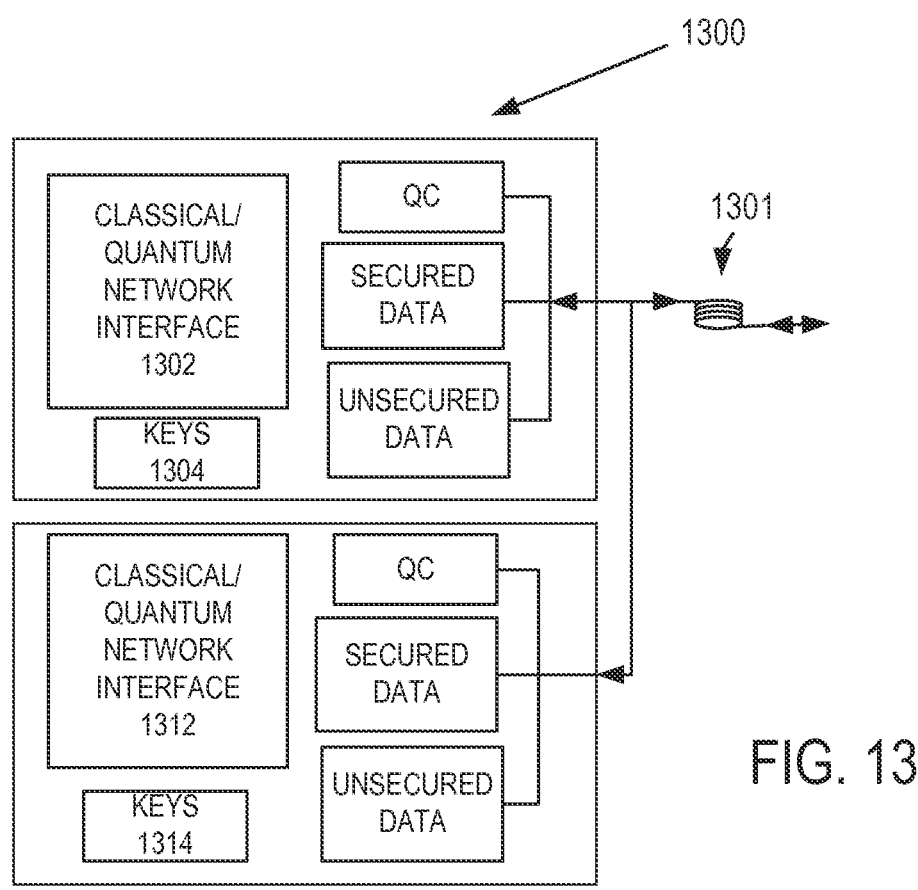
FIG. 13 illustrates a portion of a multilevel, multiuser system that includes combined classical and quantum transceiver stations coupled to a single fiber.

FIG. 13 illustrates a portion of a multilevel, multiuser system 1300 that includes transceiver stations 1302, 1312 that are configured for quantum key exchange and classical communications via a fiber 1301. The transceiver stations 1302, 1312 include respective memories 1304, 1314 that store key values obtained via QC. Each of the transceiver stations 1304, 1314 is configured to produce QC data, classical secured data (using a QC derived key), and/or unsecured data. Data can be transmitted to a single receiver, or can be multicast for use by a plurality of receivers. With such systems, difference users and different data streams can be associated with preferred security arrangements, and made available to some, all, or a selected recipient.

In the disclosed examples, QC generated keys are used for encryption and decryption. Keys can also be used for data authentication, digital signatures, or other applications, and encryption/decryption is only one example use. In some examples, data is signed, authenticated, and encrypted.

One-Time Message Authenticators Using Quantum-Secured Communications.

One-time message authenticators using quantum-secured communications facilitate low-latency authentication with assurances of security. The message authenticators can be used in conjunction with low-latency encryption of streams of packets or frames of data (generally, "messages"), and can also be used in conjunction with digital signatures for the messages. Low-latency message authenticators are especially valuable in infrastructure systems where security and latency constraints are difficult to satisfy with conventional non-quantum cryptography.

A. Theory of Message Authenticators.

Suppose a first user ("user 1") transmits a series of bits (example of message) to a second user ("user 2"). An adversary has access to the communications channel between users 1 and 2. The adversary may attempt to impersonate user 1 and send a false message (purportedly from user 1) to user 2 ("impersonation"). Or, while the message from user 1 is in transit to user 2, the adversary may attempt to alter the message from user 1 ("substitution"). User 2 receives a series of bits, which may or may not correspond to the series of bits sent by user 1.

Users 1 and 2 share a secret authenticator f. In many of the examples described herein, the authenticator f is a randomly chosen member of an $\varepsilon$-$ASU_2$ ("almost strongly universal$_2$, with deception probability $\varepsilon$") hash family H. The authenticator maps a-bit input messages to b-bit authentication tags. Suppose A is the set of messages to be authenticated (that is, the set of all a-bit strings), and suppose B is a set of authentication tags (that is, the set of all b-bit strings). An $\varepsilon$-$ASU_2$ hash family is a multi-set of functions H that satisfies the following properties. First, each function in H has domain A and range B. In other words, the function maps a-bit strings to b-bit strings. Second, for any two distinct messages $\alpha_1$, $\alpha_2$ in A, and any two authentication tags $\beta_1$, $\beta_2$ in B (not necessarily distinct), (a) a fraction $1/2^b$ of the functions in H map $\alpha_1$ to $\beta_1$, and (b) of those functions in H that map $\alpha_1$ to $\beta_1$, a fraction at most $\varepsilon$ also map $\alpha_2$ to $\beta_2$.

In general, using an authenticator from an $\varepsilon$-$ASU_2$ hash family H, user 2 can learn whether the received message is equal to the message that user 1 sent, while limiting the adversary's deception probability to at most $\varepsilon$. First, for a message $\alpha$, user 1 computes an authentication tag $\beta = f(\alpha)$. User 1 transmits the concatenation $\alpha \| \beta$ of the message $\alpha$ and tag $\beta$ to user 2, where "$\|$" denotes concatenation of bit strings. User 2 receives $\alpha' \| \beta'$, where the message $\alpha'$ and/or tag $\beta'$ may have been altered by the adversary. User 2 extracts the tag $\beta'$ from the received bits and compares the tag with $f(\alpha')$, which is a tag that user 2 computes for comparison purposes. If the received authentication tag $\beta'$ matches the computed comparison tag $f(\alpha')$, user 2 accepts the message $\alpha'$ as authentic (the received message $\alpha'$ matches the transmitted message $\alpha$).

This approach provides security against impersonation and substitution by the adversary. Suppose the adversary succeeds if the adversary induces user 2 to accept any message $\alpha'$ that is not identical to message $\alpha$. Because the adversary has no information about the authenticator f, the adversary chooses $\alpha'$ and $\beta'$ so as to maximize the probability that some authenticator function g (randomly chosen by the adversary from H) yields $g(\alpha') = \beta'$. According to property 2(a) of the $\varepsilon$-$ASU_2$ hash family (see above), the probability that $g(\alpha') = \beta'$ is $P_{d0} = 2^{-b}$ for any $\alpha'$ and $\beta'$. If the adversary can intercept and replace user 1's transmission on the channel, then the adversary has the option of delaying the attack until user 1 has revealed the tag $\beta = f(\alpha)$, which leaks some information about f Nonetheless, according to property 2(b) of the $\epsilon$-ASU$_2$ hash family (see above), the adversary cannot find another input-tag pair $\beta'=f(\alpha')$ with $\alpha'$ distinct from a, except with probability $P_{d1} \le \epsilon$. The probability of deception $P_d$ is the probability that user 2 accepts a message for which the adversary has successfully impersonated user 1 or substituted user 1's message. For example, the probability of deception $P_d$ is the higher of the probability of impersonation $P_{d0}$ and the probability of substitution $P_{d1}$. That is, $P_d = \max(P_{d0}, P_{d1})$.

If the adversary learns multiple message-tag pairs under the same function f (e.g., $\beta_1 = f(\alpha_1)$, $\beta_2 = f(\alpha_2)$, . . . ), these security assurances no longer apply. One way to limit the adversary's knowledge about the authenticator function f when working with a sequence of multiple messages and tags is to employ a new, randomly chosen secret authenticator f for each message, while denying the adversary any influence over how new authenticators are chosen. The cost in secret key material shared by users 1 and 2 (to choose authenticators) can be prohibitive with key management for conventional non-quantum cryptography, yet acceptable if users 1 and 2 perform QC. Generation of a new authenticator for each message may still be computationally intensive and hence impractical, however.

Another way to limit the adversary's knowledge about the function f when working with a sequence of multiple messages and tags is to re-use part of the authenticator. For each message $\alpha_i$ (for i=0, 1, . . . ) that user 1 wants to authenticate, user 1 computes $\beta_i = f(\alpha_i)$ as before. User 1 then encrypts $\beta_i$ using a b-bit one-time pad ("OTP") key $k_i$, before transmitting the result $\beta_i \oplus k_i$. The OTP key $k_i$ is shared with user 2 (e.g., through QKD). Upon receiving an encrypted authentication tag, user 2 applies the OTP key $k_i$ when checking the authentication. The encrypted tags are no easier for the adversary to guess than before. Re-using the basic part of the authenticator f (the part before encryption with the OTP key $k_i$) is secure because the encrypted tags do not reveal any information about the authenticator f to the adversary. Also, the time to generate the basic part of the authenticator f can be amortized over many messages. User 1 and user 2 still expend secret bits to encrypt the authentication tags (for keys $k_i$), but these secret bits can be readily generated using QC between users 1 and 2. In scenarios with multiple pairs of users, different authenticators can be chosen for each pair. By doing so, in the event of a compromise, damage can be contained and the location of the compromise identified.

B. Example Implementations of One-Time Message Authenticators.

In some example implementations, authenticators for different messages reuse part of an authentication function f but apply different OTP keys $k_i$. The authenticators can be used for one-time authentication between a PMU and PDC of an electric grid, in a SCADA system of an electric grid, or in another infrastructure system. The authenticators have a small size, typically increasing overall bandwidth by only a small amount. They use stream-wise operations, avoiding buffering or holdback of a message when determining its authentication tag, and potentially accommodating messages of variable length. The authenticators use cyclic redundancy code ("CRC") operations. As such, they can be efficiently implemented in hardware or software by drawing on CRC tools that have been extensively deployed for the purpose of data integrity checking.

In the example implementations, an authenticator f of the hash family is described by an ordered pair (p, k), where p is an irreducible binary polynomial of degree b, and k is a b-bit string for a quantum key. The authenticator f for message $\alpha$ has the following form:

$$f(\alpha) = \{[\alpha(x) \cdot x^b] \bmod p\} \oplus k,$$

where $\alpha(x)$ is a binary polynomial whose coefficients are the bits of the message $\alpha$. The bits of the message $\alpha$ are shifted to the left by b bit positions. The b-bit shift is introduced by multiplication by $x^b$ and provides security against undetected manipulation of the b low-order bits of the message $\alpha$. Just as in conventional CRC, the remainder is calculated after division of this polynomial $\alpha(x) \cdot x^b$ by p. The coefficients of the remainder form a b-bit string, which is XOR'd with the key k.

Both p and k are based on secret bits shared by user 1 and user 2, and each of p and k is specified by b secret bits. Users 1 and 2 can determine a new irreducible polynomial p for each new message, but the computational cost of determining the polynomials can be prohibitive. Instead, users 1 and 2 can reuse the same secret polynomial p for authenticating multiple messages, but use a different secret key k for each message. The cryptographic CRC hash family of these example implementations is $\epsilon$-ASU$_2$ for $\epsilon = 2(a+b)/2^b$.

In other example implementations, the authenticators use hashing operations with Toeplitz matrices. The authenticators can be used for one-time authentication between a PMU and PDC of an electric grid, in a SCADA system of an electric grid, or in another infrastructure system. The authenticators have a small size, typically increasing overall bandwidth by only a small amount. They use stream-wise operations, avoiding buffering or holdback of a message when determining its authentication tag, and potentially accommodating messages of variable length.

A Toeplitz authenticator T is an a×b binary matrix (a columns and b rows) in which the first row and column elements are defined by a+b−1 random bits. The a+b−1 random bits are from a quantum key. The Toeplitz authenticator T acts on an a-row vector a of message bits as input, producing a b-row vector of bits (the tag) as output: b-bit tag=T·$\alpha$. A new Toeplitz matrix T can be generated using a new set of a+b−1 random bits (part of a quantum key) for every new message $\alpha$. Or, the Toeplitz matrix T in the authenticator can be reused to authenticate many messages by XOR-ing the b-bit tag with a new b-bit secret key k for each message $\alpha$, where the key k is part of a quantum key. Treating the key k as a b-row vector, the authentication tag for a message M in this case would be:

$$f(\alpha) = (T \cdot \alpha) \oplus k.$$

For a given tag size of b bits, a Toeplitz authenticator has a smaller deception probability ($P_d = 2^{-b}$) than a cryptographic CRC authenticator, but requires a much larger number of bits to specify the authenticator: (a+b−1) in the Toeplitz case. If a fresh Toeplitz matrix T is picked for each message, this would require a higher rate of key material than for CRC authenticators. In the matrix T reuse version, however, the secret key cost for the Toeplitz matrix T would be amortized over many messages, and so the Toeplitz authenticator would come close to the efficiency of the CRC authenticator in terms of use of quantum key material.

A Toeplitz authenticator can be efficiently implemented using a linear feedback shift register ("LFSR") that allows it to be applied to a message without holdback or buffering of message bits. This implementation can use fast Toeplitz binary matrix multiplication with finite impulse response ("FIR") filtering as described in section 4.2 of Xu et al., "Fixed-point Analysis and Realization of a Blind Beamforming Algorithm," Proc. SPIE 3807, 188-199 (1999). The Toeplitz authenticator can be implemented in software, FPGA, or ASIC using commonly available LFSR tools.

For additional explanation of the theory behind authenticators using CRC operations, hashing operations with Toeplitz matrices, and LSFRs, see Hugo Krawczyk, "LSFR-based Hashing and Authentication," CRYPTO '94, LNCS 839, pp. 129-139 (1994). The Krawczyk paper generally describes authenticators used in the context of conventional non-quantum cryptography, but it does not address how to adapt the authenticators for quantum cryptography, nor does it address how to generate enough key material to use the authenticators for one-time message authentication in many real-world scenarios.

C. Techniques for Quantum-Secured Communications Incorporating One-Time Authenticators.

Figure 14:
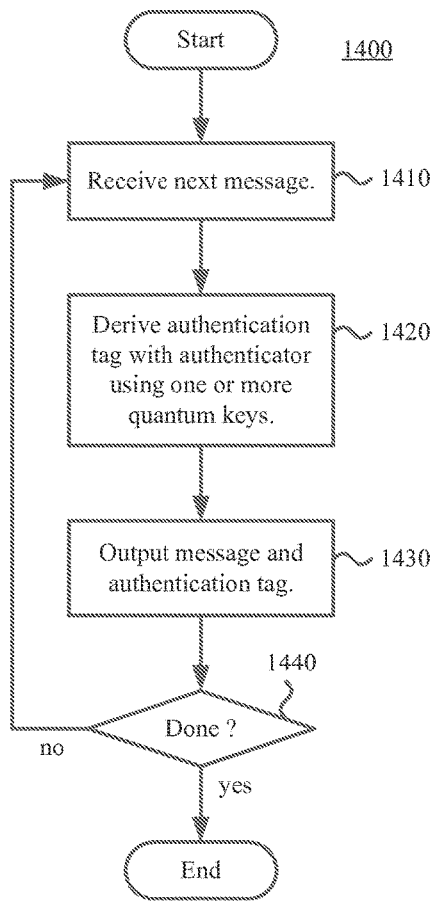
FIG. 14 shows a generalized technique, from the perspective of a message transmitter, for quantum-secured communications using message authenticators. messages and deriving authentication tags.

FIG. 14 shows a generalized technique (1400), from the perspective of a message transmitter, for quantum-secured communications using message authenticators. A message transmitter such as a PMU, PDC or other node in an electric grid, a node in a high-speed trading system, a control station in a water management system, a control station in an oil or gas distribution system, or other device can perform the technique (1400).

The message transmitter receives (1410) a message. For example, the message transmitter receives the message from another module of a computing device. The message can be formatted as a packet or frame, or it can be formatted in some other way. Any type of data can be included in the message. The message can be encrypted or not encrypted.

The message transmitter derives (1420) an authentication tag based at least in part on an authenticator that uses one or more quantum keys. The authenticator can include stream-wise operations, such that buffering of all of a message is not required to derive its authentication tag, and such that messages can have variable length. Alternatively, the authenticator buffers the message when deriving the authentication tag, or messages have a fixed length.

In some example implementations, the authenticator uses CRC operations. For example, the authenticator is a function $f(\alpha)$ that uses a binary polynomial $\alpha(x)$ based on the message, uses an irreducible binary polynomial p of degree b, and uses a b-bit quantum key k of the one or more quantum keys. Bits of the message can be coefficients of the binary polynomial $\alpha(x)$. The irreducible binary polynomial p can be determined as described with reference to FIG. 18, or it can be determined in some other way. Alternatively, the message transmitter uses a message authenticator with another form. For example, the message authenticator uses hashing operations with Toeplitz matrices.

The message transmitter outputs (1430) the message and authentication tag. In doing so, the message transmitter can concatenate the message and its authentication tag as a bit string. For example, the message transmitter outputs the message and authentication tag over a channel such as the Internet. Or, the message transmitter outputs the message and authentication tag over a dedicated connection to the message receiver. The message and authentication tag can be output as part of a data stream on a single fiber connection. Alternatively, the message transmitter outputs the message and authentication tag in some other way.

Derivation (1420) of the authentication tag can follow message encryption and use bits of the encrypted message, so as to authenticate the encrypted message. This can be suitable for so-called layer 3 encryption, in which packet headers (e.g., TCP/IP headers) are not encrypted and normal packet routing is used. Alternatively, derivation (1420) of the authentication tag can precede encryption of the message and use bits of the unencrypted message. This can be suitable for so-called layer 2 encryption, in which all bits (including packet headers) are encrypted and data flows directly between users. Or, derivation (1420) of the authentication tag can use bits of a message that is never encrypted.

The message transmitter checks (1440) whether to continue with another message. If so, the message transmitter receives (1410) the next message and derives (1420) its authentication tag. Quantum keys used for the authenticator can be acquired by QKD that is performed concurrently with message authentication. Alternatively, quantum keys are acquired first, before the message transmitter starts receiving messages and deriving authentication tags.

Figure 15:
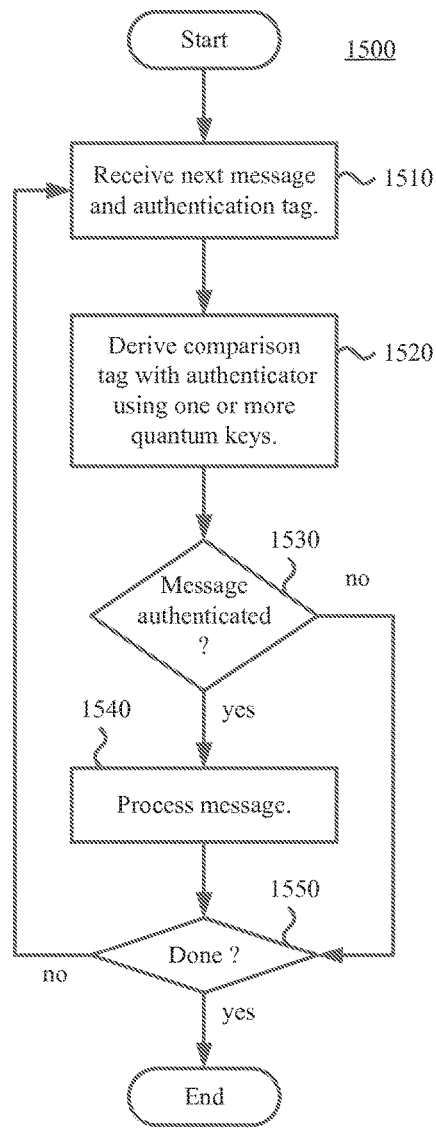
FIG. 15 shows a generalized technique, from the perspective of a message receiver, for quantum-secured communications using message authenticators.

FIG. 15 shows a generalized technique (1500), from the perspective of a message receiver, for quantum-secured communications using message authenticators. A message receiver such as a PMU, PDC or other node in an electric grid, a node in a high-speed trading system, a control station in a water management system, a control station in an oil or gas distribution system, or other device can perform the technique (1500).

The message receiver receives (1510) a message and its authentication tag. For example, the message receiver receives the message and authentication tag over a channel such as the Internet. Or, the message receiver receives the message and authentication tag over a dedicated connection to the message transmitter. The message and authentication tag can be received as part of a data stream on a single fiber connection. Alternatively, the message receiver receives the message and authentication tag in some other way. The message can be formatted as a packet or frame, or it can be formatted in some other way. Any type of data can be included in the message. The message can be encrypted or not encrypted.

The message receiver derives (1520) a comparison tag for the message based at least in part on an authenticator that uses one or more quantum keys. The authenticator can include stream-wise operations, such that buffering of all of a message is not required to derive its authentication tag, and such that messages can have variable length. Alternatively, the authenticator buffers the message when deriving the comparison tag, or messages have a fixed length.

In some example implementations, the authenticator uses CRC operations. For example, the authenticator is a function $f(\alpha)$ that uses a binary polynomial $\alpha(x)$ based on the message, uses an irreducible binary polynomial p of degree b, and uses a b-bit quantum key k of the one or more quantum keys. Bits of the message can be coefficients of the binary polynomial $\alpha(x)$. The irreducible binary polynomial p can be determined as described with reference to FIG. 18, or it can be determined in some other way. Alternatively, the message receiver uses a message authenticator with another form. For example, the message authenticator uses hashing operations with Toeplitz matrices.

The message receiver checks (1530) whether the message is authentic based on a comparison of the received authentication tag and the comparison tag derived by the message receiver. If the authentication tag matches the comparison tag, the message receiver processes (1540) the message. For example, the message receiver provides the message to another module of the device. Otherwise (message not authenticated), the message receiver skips the processing (1540).

Derivation (1520) of the comparison tag can precede message decryption and use bits of the encrypted message, so as to authenticate the encrypted message. In this case, the message can be decrypted as part of the processing (1540)

of the message. Alternatively, derivation (1520) of the comparison tag can follow decryption and use bits of the decrypted message. Or, derivation (1520) of the comparison tag can use bits of a message that is never encrypted.

Whether or not the message is authenticated, the message receiver checks (1550) whether to continue with another message. If so, the message receiver receives (1510) the next message and its authentication tag, and derives (1520) a comparison tag. Quantum keys used for the authenticator can be acquired by QKD that is performed concurrently with message authentication. Alternatively, quantum keys are acquired first, before the message receiver starts receiving messages and deriving tags.

Figure 16:
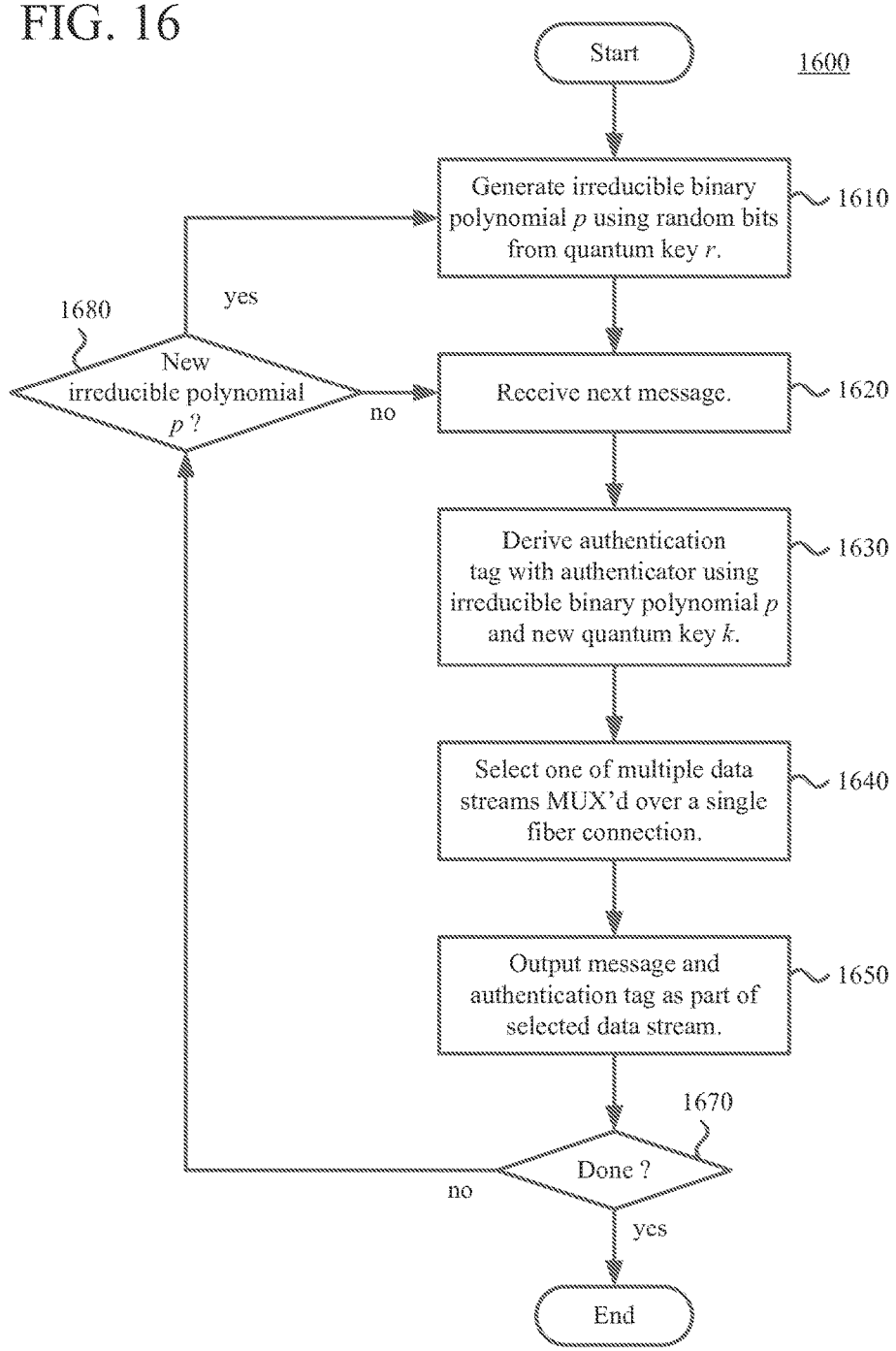
FIG. 16 shows an example technique, from the perspective of a message transmitter, for quantum-secured communications using message authenticators with CRC operations and multi-level security.

FIG. 16 shows an example technique (1600), from the perspective of a message transmitter, for quantum-secured communications using message authenticators with CRC operations and multi-level security. A message transmitter such as a PMU, PDC or other node in an electric grid, a node in a high-speed trading system, a control station in a water management system, a control station in an oil or gas distribution system, or other device can perform the technique (1600). To support multi-level security on a single fiber connection, the message transmitter can repeat certain intermediate stages of the technique (1600) for each of multiple messages, which are output as part of multiple data streams multiplexed on the single fiber connection.

The message transmitter generates (1610) an irreducible binary polynomial p using random bits from a quantum key r. The irreducible binary polynomial p can be determined as described with reference to FIG. 18, or it can be determined in some other way.

The message transmitter receives (1620) a message. For example, the message transmitter receives the message from another module of a computing device. The message can be formatted as a packet or frame, or it can be formatted in some other way. Any type of data can be included in the message. The message can be encrypted or not encrypted.

The message transmitter derives (1630) an authentication tag for the message based at least in part on an authenticator that uses the irreducible binary polynomial p and also uses a quantum key k. For example, the authenticator is a function f (α) that uses a binary polynomial α(x) based on the message, uses the irreducible binary polynomial p (of degree b), and uses a quantum key k (b bits). For one-time authentication, the key k is a new quantum key.

The message transmitter selects (1640) one of the multiple data streams that are multiplexed over the single fiber connection. For example, different data streams can be associated with different levels of quality of service ("QOS") or different types of traffic. The message transmitter outputs (1650) the message and its authentication tag as part of the selected data stream. For example, the message transmitter concatenates the message and its authentication tag as a bit string, which is output as part of the selected data stream over the single fiber connection.

The message transmitter checks (1670) whether to continue with another message. If so, the message transmitter checks (1680) whether to generate a new irreducible polynomial p. For one-time authentication with low computational complexity, the message transmitter can reuse the irreducible binary polynomial p in the authenticator for different messages, but use different values of the key k in the authenticator for the different messages. From time to time, however, the message transmitter can generate (1610) a new irreducible polynomial. The message transmitter continues by receiving (1620) the next message and deriving (1630) its authentication tag.

Figure 17:
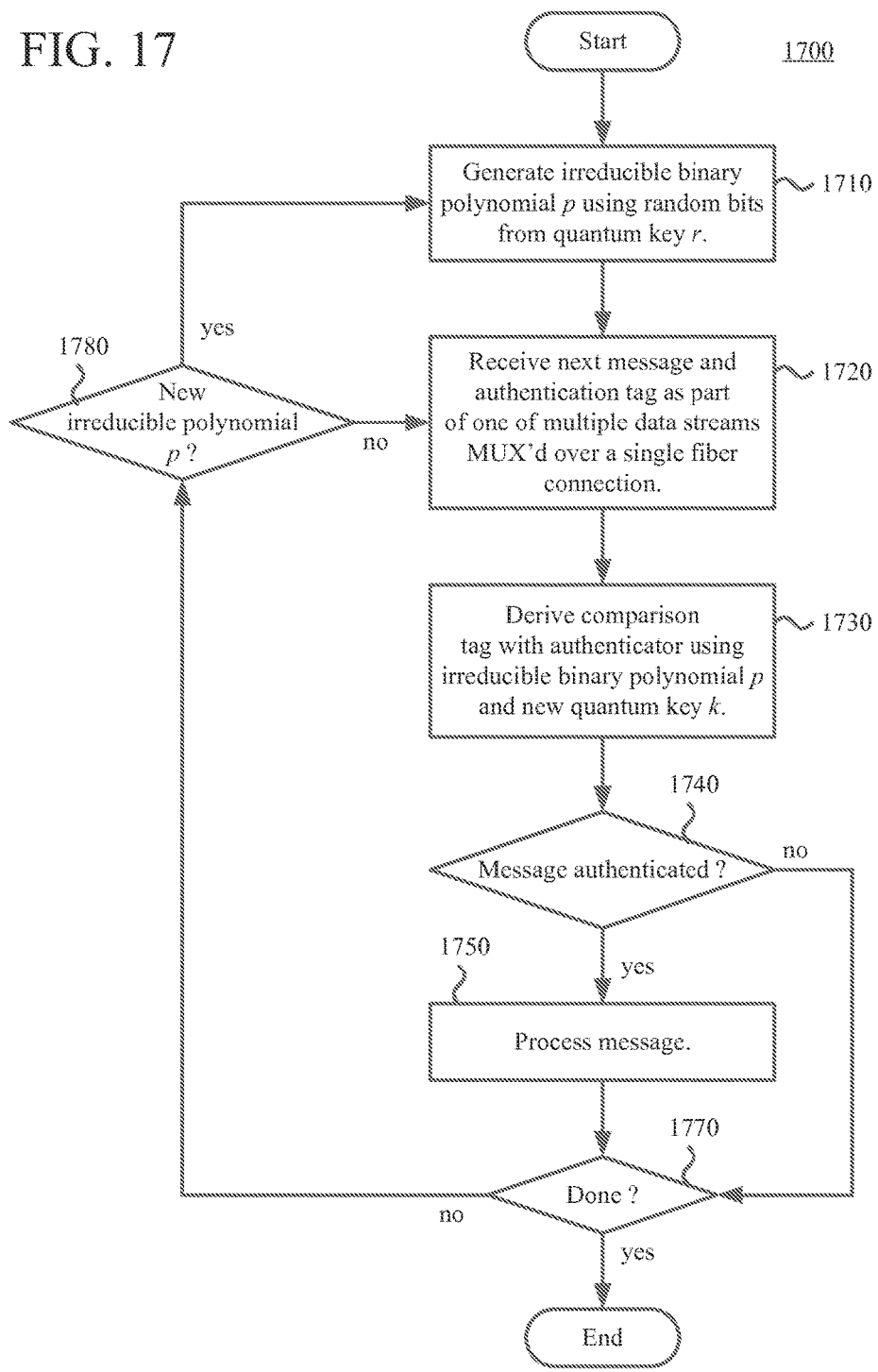
FIG. 17 shows an example technique, from the perspective of a message receiver, for quantum-secured communications using message authenticators with CRC operations and multi-level security.

FIG. 17 shows an example technique (1700), from the perspective of a message receiver, for quantum-secured communications using message authenticators with CRC operations and multi-level security. A message receiver such as a PMU, PDC or other node in an electric grid, a node in a high-speed trading system, a control station in a water management system, a control station in an oil or gas distribution system, or other device can perform the technique (1700). To support multi-level security on a single fiber connection, the message receiver can repeat certain intermediate stages of the technique (1700) for each of multiple messages, which are received as part of multiple data streams multiplexed on the single fiber connection.

The message receiver generates (1710) an irreducible binary polynomial p using random bits from a quantum key r. The irreducible binary polynomial p can be determined as described with reference to FIG. 18, or it can be determined in some other way.

The message receiver receives (1720) a message and its authentication tag as part of one of the multiple data streams multiplexed over the single fiber connection. The message can be formatted as a packet or frame, or it can be formatted in some other way. Any type of data can be included in the message. The message can be encrypted or not encrypted. The message receiver derives (1730) a comparison tag for the message based at least in part on an authenticator that uses the irreducible binary polynomial p and also uses a quantum key k. For example, the authenticator is a function f (α) that uses a binary polynomial α(x) based on the message, uses the irreducible binary polynomial p (of degree b), and uses a quantum key k (b bits). For one-time authentication, the key k is a new quantum key.

The message receiver checks (1740) whether the message is authentic based on a comparison of the received authentication tag and the comparison tag derived by the message receiver. If the authentication tag matches the comparison tag, the message receiver processes (1750) the message. For example, the message receiver provides the message to another module of the device. The message receiver can also decrypt the message. Otherwise (message not authenticated), the message receiver skips the processing (1750).

Whether or not the message is authenticated, the message receiver checks (1770) whether to continue with another message. If so, the message receiver checks (1780) whether to generate a new irreducible polynomial p. For one-time authentication with low computational complexity, the message receiver can reuse the irreducible binary polynomial p in the authenticator for different messages, but use different values of the key k in the authenticator for the different messages. From time to time, however, the message receiver can generate (1710) a new irreducible polynomial. The message receiver continues by receiving (1720) the next message and deriving (1730) its comparison tag.

D. Generating Irreducible Binary Polynomials Using Quantum Keys.

In some example implementations, a b-bit tag is the remainder after dividing an arbitrary a-bit message (regarded as a degree a polynomial) by a degree b polynomial. The degree b polynomial is an irreducible polynomial, meaning it cannot be written as a product of polynomials of smaller degree. The coefficients of the terms in the polynomial are binary values, and the polynomials are polynomials over the space GF(2). The degree of a polynomial is the highest power of x occurring in the polynomial. For example, $x^4+x^1+1$ is degree 4.

Figure 18:
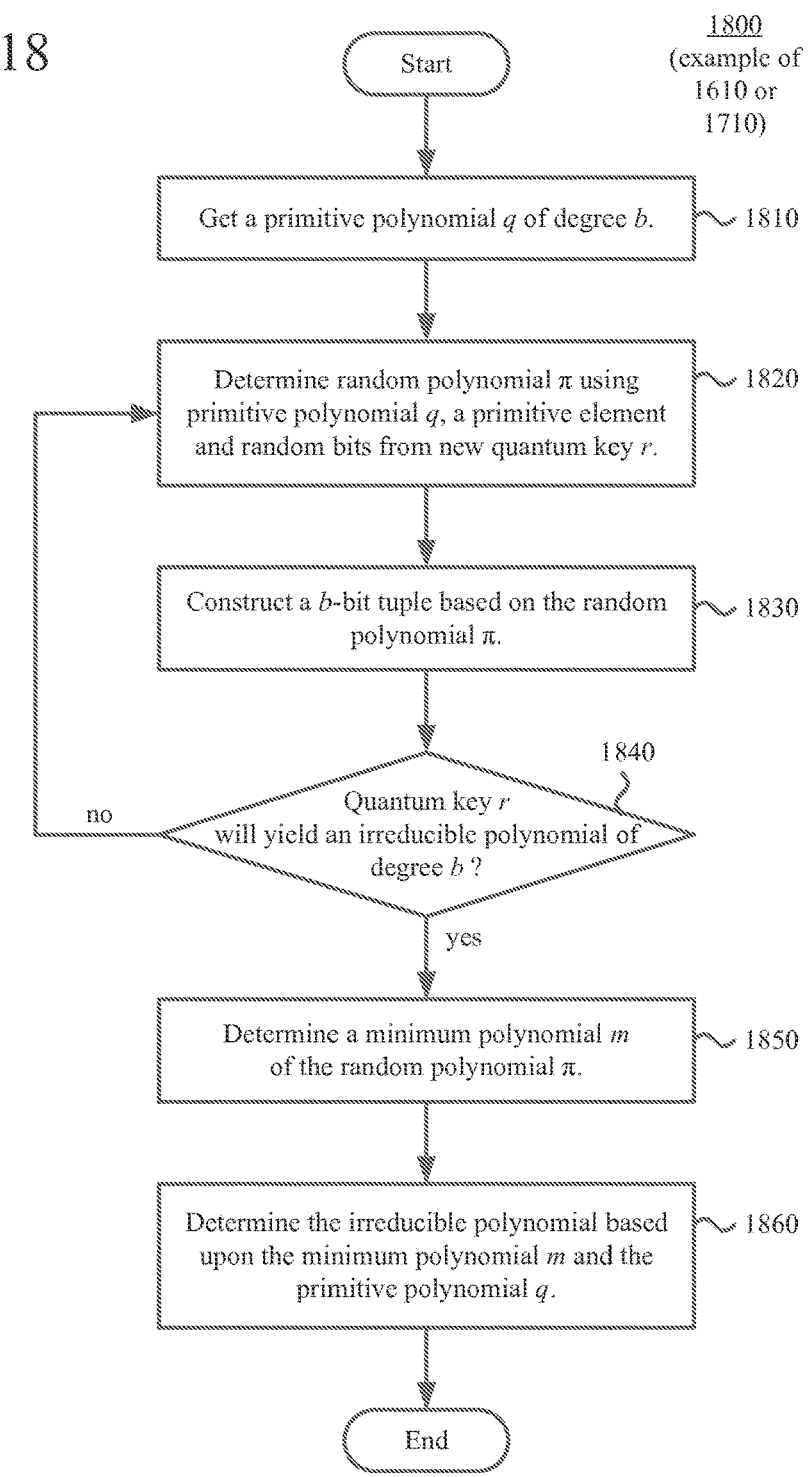
FIG. 18 shows an example technique for generating an irreducible binary polynomial to be used in a message authenticator for quantum-secured communications.

FIG. 18 shows an example technique (1800) for generating an irreducible binary polynomial to be used in a message authenticator for quantum-secured communications. A tool such as a PMU, PDC or other node in an electric grid, a node in a high-speed trading system, a control station in a water management system, a control station in an oil or gas distribution system, or other device can perform the technique (1800).

To start, the tool gets (1810) a primitive polynomial q of degree b. For example, the tool picks a degree b primitive polynomial q from a look-up table in response to user input, or user input directly indicates the primitive polynomial q. The table or list of b-degree primitive polynomials can be retrieved from a local database, the World Wide Web or another source. This can be a one-time choice, or the tool can repeat the selecting (1810) from time to time. The primitive polynomial q can be represented as a (b+1)-bit tuple Q.

The tool determines (1820) a random polynomial $\pi$ using the primitive polynomial q, a primitive element and bits from a quantum key r of the one or more quantum keys. For example, the tool gets b random bits representing a random integer R from the quantum key q, and the tool determines a primitive element a of space $GF(2^b)$. Space $GF(2^b)$ has dimension $(2^b-1)$, not $2^b$. The tool raises the primitive element a by the $R^{th}$ power to determine the random polynomial: $\pi=a^R$ mod q. Because $a^0=a^{(2^b)-1}=1$ mod q, and because $\pi=1$ cannot result in a degree b irreducible polynomial, R has a value between 1 and $(2^b-2)$. If R=0 or $(2^b-1)$, the tool gets new random bits for R (from another quantum key) and starts over.

Otherwise (value of R appropriate), the tool constructs (1830) a b-bit tuple based on the random polynomial $\pi$. For example, using the random integer R, the tool constructs as a b-bit tuple $P_0$ the element $\pi=a^R$ mod q of space $GF(2^b)$. This construction can be done efficiently starting from the b-tuple representation of a (A=[0 0 . . . 0 1 0]) using a square-and-multiply method, with intermediate reductions mod q using polynomial division with the (b+1)-bit tuple representation Q of q.

Using the b-bit tuple, the tool checks (1840) whether the quantum key r will yield a b-degree polynomial that cannot be reduced. In particular, the tool checks whether the current value of R will give an irreducible polynomial of degree b, as opposed to a polynomial of lower degree. For k=1, 2 . . . , (b-1), the tool in turn calculates $\pi^{2^k}$ mod q, storing each intermediate result as b-tuple $P_k$ and comparing the result with P. If $P_k=P$ for some k<(b-1), the procedure would give a polynomial of degree smaller than b (failure case). If so, the tool determines a new random polynomial $\pi$ using a different value for R.

Otherwise, the tool determines (1850) a minimum polynomial m of the random polynomial $\pi$. By the properties of minimal polynomials, the minimal polynomial m(x) of $\pi$ has the form $m(x)=(x+\pi)\cdot(x+\pi^2)\cdot(x+\pi^4)\cdot \ldots \cdot(x+\pi^{2^{(b-1)}})$, because of the above selection of R. The tool generates m as a (b+1)-bit tuple, as follows. The tool evaluates m(a) as a b-tuple M by calculating each bracket in the product $M=(A+P_0)\cdot(A+P_1)\cdot \ldots \cdot(A+P_{(b-1)})$, using the $P_k$ values calculated above, multiplying the sums in the brackets, and reducing the product mod q to get the remainder.

Finally, the tool determines (1860) the irreducible polynomial based upon the minimum polynomial m and the primitive polynomial q. For example, the tool produces the (b+1)-bit tuple H representation of m as H=(M+Q) for the irreducible polynomial. Polynomial arithmetic is binary arithmetic mod 2 on the coefficients (e.g., addition is bitwise XOR of coefficients).

For additional details about stages of generating the irreducible polynomial, see (1) Shoup, "Fast Construction of Irreducible Polynomials over Finite Fields," Proc. Fourth Annual ACM-SIAM Symposium on Discrete Algorithms, pp. 484-492 (1993), and (2) Gordon, "Very Simple Method to Find the Minimum Polynomial of an Arbitrary Nonzero Element of a Finite Field," Electronics Letters 12, pp. 663-664 (1976).

For example, to generate a 4-bit authentication tag, the tool finds a random irreducible polynomial of degree 4. That is, the tool finds a random polynomial p of the form $p(x)=x^4+sx^3+tx^2+ux+1$, where s, t, u=0 or 1, that cannot be factored into a product of lower degree polynomials. (The coefficient of $x^0$ is 1, otherwise p would factor into $p(x)=x\cdot v(x)$, with v having degree 3, contradicting the irreducibility of p.)

To start, the tool gets a primitive polynomial q of degree 4. For example, among the two 4-degree primitive polynomials $x^4+x+1$ and $x^4+x^3+1$, the tool selects the primitive polynomial $q(x)=x^4+x+1$, which has the 5-tuple representation Q=10011. The primitive polynomial is irreducible, and so it has no roots over GF(2). It does, however, have roots in the space of polynomials of degree <4, $GF(2^4)$. Any one of these roots is a primitive element of $GF(2^4)$, meaning that any element of $GF(2^4)$ can be expressed as a power of a primitive element.

The following table shows 4-bit tuples $P_0$ for different values of integer R.

| $\pi$ | $P_0$ | $\{\pi, \pi^2, \pi^4, \pi^8\}$ |
|---|---|---|
| $a^0$ | 0001 | $\{a^0, a^0, a^0, a^0\}$ |
| $a^1$ | 0010 | $\{a^1, a^2, a^4, a^8\}$ |
| $a^2$ | 0100 | $\{a^2, a^4, a^8, a^1\}$ |
| $a^3$ | 1000 | $\{a^3, a^6, a^{12}, a^9\}$ |
| $a^4$ | 0011 | $\{a^4, a^8, a^1, a^2\}$ |
| $a^5$ | 0110 | $\{a^5, a^{10}, a^5, a^{10}\}$ |
| $a^6$ | 1100 | $\{a^6, a^{12}, a^9, a^3\}$ |
| $a^7$ | 1011 | $\{a^7, a^{14}, a^{13}, a^{11}\}$ |
| $a^8$ | 0101 | $\{a^8, a^1, a^2, a^4\}$ |
| $a^9$ | 1010 | $\{a^9, a^3, a^6, a^{12}\}$ |
| $a^{10}$ | 0111 | $\{a^{10}, a^5, a^{10}, a^5\}$ |
| $a^{11}$ | 1110 | $\{a^{11}, a^7, a^{14}, a^{13}\}$ |
| $a^{12}$ | 1111 | $\{a^{12}, a^9, a^3, a^6\}$ |
| $a^{13}$ | 1101 | $\{a^{13}, a^{11}, a^7, a^{14}\}$ |
| $a^{14}$ | 1001 | $\{a^{14}, a^{13}, a^{11}, a^7\}$ |

Using a value of R from the set {5, 10} will not be successful, but using a value of R from any of the sets of values {1, 2, 4, 8}, {3, 6, 9, 12} or {7, 11, 13, 14} will result in successful execution of the algorithm. For example, suppose R=3. The tool calculates the minimum polynomial $m_{a^3}(a)=(a+a^3)\cdot(a+a^6)\cdot(a+a^{12})\sim(a+a^9)=a^9\cdot a^{11}\cdot a^{13}\cdot a^3$. The value of $a^9\cdot a^{11}\cdot a^{13}\cdot a^3=a^6$, by multiplying the polynomials and determining the remainder of the product mod q. After those operations, M=1100. For this case, the hash function H can be represented as a 5-tuple H=M+Q=11111. This indicates the irreducible degree-4 polynomial $x^4+x^3+x^2+x+1$. Using any R within {3, 6, 9, 12} will result in the algorithm outputting the same irreducible polynomial $x^4+x^3+x^2+x+1$.

If R=7, the minimum polynomial is $m_{a^7}(a)=(a+a^7)\cdot(a+a^{14})\cdot(a+a^{13})\cdot(a+a^{11})=a^{14}\cdot a^7\cdot a^{12}\cdot a^6$. The value of $a^{14}\cdot a^7\cdot a^{12}\cdot a^6=a^9$, by multiplying the polynomials and determining the remainder of the product mod q. After those operations, M=1010. In this case, H=M+Q=11001, which indicates the irreducible polynomial $x^4+x^3+1$. Using any R within {7, 11, 13, 14} will result in the algorithm outputting the same irreducible polynomial $x^4+x^3+1$.

If R=1, the minimum polynomial $m_{a^1}(a)=0$, so M=0000. H=M+Q=10011, which indicates the irreducible polynomial $x^4+x+1$, or the primitive polynomial q. Using any R within {1, 2, 4, 8} will result in the algorithm outputting the same irreducible polynomial $x^4+x+1$.

The different values for R can yield one of the three 4-degree irreducible polynomials $x^4+x+1$, $x^4+x^3+1$, and $x^4+x^3+x^2+x+1$. In each case M is even (right most bit is 0), as it must be to give a value H with a rightmost bit of 1 after adding M to Q.

E. Results.

The security parameter ε for authenticators in example implementations depends on message length a as well as authentication tag length b. $\varepsilon=2(a+b)/2^b$. Given the bandwidth of a connection, one can also estimate the expected time $T_d$ at which the cumulative probability of deception (impersonation or substitution) reaches 50%. $T_d=0.5/(P_d \times \text{frame\_rate})$, where frame_rate is the number of messages per second. The following table shows values of ε and $T_d$ for messages transmitted over a 9600-bps serial SCADA link, for two different message lengths and three different tag lengths. The two message lengths are for a typical SCADA message (20 bytes, a=160 bits) and large SCADA message (250 bytes, a=2,000 bits). The three tag lengths are b=16 (2 bytes), b=32 (4 bytes), and b=48 (6 bytes).

| | typical SCADA message (a = 160 bits) | | large SCADA message (a = 2,000 bits) | |
|---|---|---|---|---|
| authenticator size (bits) | deception probability ε | deception time $T_d$ | deception probability ε | deception time $T_d$ |
| b = 16 | $5 \times 10^{-3}$ | 1.5 s | $6 \times 10^{-2}$ | 1.7 s |
| b = 32 | $9 \times 10^{-8}$ | 1.1 days | $9 \times 10^{-7}$ | 1.3 days |
| b = 48 | $10^{-12}$ | 179 years | $10^{-11}$ | 227 years |

With a 6-byte authentication tag, the expected security time is measured in decades. For short messages (160 bits), up to 60 messages are sent per second over the 9600 bps connection. When QKD is performed concurrently with authentication, to support this level of security, users generate shared secret random bits at a rate of up to 60×48=2.88 kbps in order to produce the OTP keys k used by the authenticators to produce the authentication tags. (The cost of b shared secret bit to generate the random irreducible polynomial p is amortized over many messages, and hence not considered here.) Such QKD rates are readily achievable using QC over optical fiber between users for distances less than about 10 km. Such QKD rates are also achievable using QC over longer distances (up to ~100 km) by using the output of a cryptographic deterministic random number generator whose secret seed value is frequently updated using QC.

In view of the many possible embodiments to which the principles of the disclosed invention may be applied, it should be recognized that the illustrated embodiments are only preferred examples and should not be taken as limiting the scope of the disclosure. Rather, the scope of the invention is defined by the following claims. We therefore claim as our invention all that comes within the scope and spirit of these claims.

We claim:

1. An apparatus, comprising:
    a wavelength division multiplexer (WDM) configured to separate incoming optical signals, received via a communication optical fiber, into first optical signals in a first wavelength range and second optical signals in a second wavelength range;
    at least one spectral filter configured to receive the first optical signals from the WDM and output spectrally filtered optical signals, the at least one spectral filter comprising a distributed Bragg reflector;
    a quantum receiver configured to receive the spectrally filtered optical signals; and
    a classical receiver configured to receive at least a portion of the second optical signals.

2. The apparatus of claim 1, wherein the second wavelength range corresponds to about 1310 nm.

3. The apparatus of claim 1, wherein the first wavelength range corresponds to about 1550 nm.

4. The apparatus of claim 1, wherein the at least one spectral filter is configured to attenuate the first optical signals by at least 80 dB.

5. The apparatus of claim 1, wherein the distributed Bragg reflector comprises a fiber Bragg grating.

6. The apparatus of claim 5, wherein the at least one spectral filter further comprises an optical circulator coupled to the fiber Bragg grating.

7. The apparatus of claim 6, wherein the at least one spectral filter further comprises a bandpass filter configured to receive the first optical signals from the WDM and output bandpass filtered signals to the optical circulator.

8. The apparatus of claim 1, further comprising:
    a processor configured to establish a security parameter based on quantum communications received by the quantum receiver via the communication optical fiber and classical communications received by the classical receiver via the communication optical fiber.

9. The apparatus of claim 8, wherein the processor is further configured to produce at least the portion of a raw key based at least in part on a portion of the second optical signals that includes an identification of at least one quantum basis associated with at least the portion of the raw key.

10. The apparatus of claim 8, wherein the processor is further configured to decrypt data or commands received via the communication optical fiber or verify authentication or verify signature of data or commands received via the communication optical fiber.

11. The apparatus of claim 1, wherein the at least one spectral filter further comprises an optical circulator coupled to the distributed Bragg reflector.

12. The apparatus of claim 11, wherein the at least one spectral filter further comprises a bandpass filter configured to receive the first optical signals from the WDM and output bandpass filtered signals to the optical circulator.

13. A method, comprising:
    receiving incoming optical signals over a communication optical fiber;
    separating, using a wavelength division multiplexer (WDM), the incoming optical signals into first optical signals in a first wavelength range and second optical signals in a second wavelength range;
    filtering, using at least one spectral filter that includes a distributed Bragg reflector, the first optical signals output from the WDM to produce spectrally filtered optical signals;
    receiving, by a quantum receiver, the spectrally filtered optical signals; and
    receiving, by a classical receiver, at least a portion of the second optical signals.

14. The method of claim 13, further comprising receiving unencrypted classical optical signals, associated with quantum key generation, over the communication optical fiber.

15. The method of claim 13, further comprising:
establishing a security parameter based on quantum communications received by the quantum receiver via the communication optical fiber and classical communications received by the classical receiver via the communication optical fiber.

16. The method of claim 15, wherein:
the security parameter comprises at least one shared key; and
the method further comprises communicating user data or commands over the communication optical fiber, wherein the user data or commands are processed based on the at least one shared key so as to be encrypted, decrypted, authenticated, or digitally signed.

17. The method of claim 16, wherein the user data or commands are contained within a data packet, and wherein the data packet includes a data flag indicating that the processing is associated with one or more of encryption, authentication, or digital signature.

18. The method of claim 13, wherein the distributed Bragg reflector comprises a fiber Bragg grating (FBG).

19. The method of claim 18, wherein the at least one spectral filter further comprises an optical circulator coupled to the fiber Bragg grating.

20. The method of claim 19, wherein the at least one spectral filter further comprises a bandpass filter configured to receive the first optical signals from the WDM and output bandpass filtered signals to the optical circulator.

21. The method of claim 13, wherein the at least one spectral filter further comprises an optical circulator coupled to the distributed Bragg reflector.

22. The method of claim 21, wherein the at least one spectral filter further comprises a bandpass filter configured to receive the first optical signals from the WDM and output bandpass filtered signals to the optical circulator.

* * * * *

UNITED STATES PATENT AND TRADEMARK OFFICE
CERTIFICATE OF CORRECTION

PATENT NO. : 10,291,399 B2  
APPLICATION NO. : 15/026001  
DATED : May 14, 2019  
INVENTOR(S) : Jane Elizabeth Nordholt et al.

Page 1 of 1

It is certified that error appears in the above-identified patent and that said Letters Patent is hereby corrected as shown below:

On the Title Page

(73) Assignee; Line 1 please amend:  
"Traid National Security, LLC, Los Alamos, NM (US)"  
To:  
--Triad National Security, LLC, Los Alamos, NM (US)--

Signed and Sealed this  
First Day of October, 2019

Andrei Iancu  
*Director of the United States Patent and Trademark Office*